(12) United States Patent
Yamamoto

(10) Patent No.: US 10,681,268 B2
(45) Date of Patent: Jun. 9, 2020

(54) IMAGING SYSTEM, IMAGING APPARATUS, AND SYSTEM

(71) Applicant: RICOH COMPANY, Ltd., Ohta-Ku (JP)

(72) Inventor: Hideaki Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/941,152

(22) Filed: Nov. 13, 2015

(65) Prior Publication Data

US 2016/0073024 A1    Mar. 10, 2016

Related U.S. Application Data

(63) Continuation of application No. PCT/JP2015/064391, filed on May 13, 2015.

(30) Foreign Application Priority Data

| May 15, 2014 | (JP) | 2014-101058 |
| Feb. 6, 2015 | (JP) | 2015-021878 |
| Apr. 20, 2015 | (JP) | 2015-085601 |

(51) Int. Cl.
*H04N 5/232* (2006.01)
*G06T 1/00* (2006.01)
(Continued)

(52) U.S. Cl.
CPC ....... *H04N 5/23238* (2013.01); *G06T 1/0007* (2013.01); *H04N 5/2258* (2013.01);
(Continued)

(58) Field of Classification Search
CPC .. H04N 5/232; H04N 5/23238; H04N 5/2258; H04N 5/23229; H04N 5/23258;
(Continued)

(56) References Cited

U.S. PATENT DOCUMENTS 5,159,401 A * 10/1992 Decker, Jr. ............... G01C 1/00
                                                                33/282
5,185,667 A    2/1993 Zimmermann
(Continued)

FOREIGN PATENT DOCUMENTS

| CN | 103685886 A | 3/2014 |
| CN | 101867720 A | 10/2014 |

(Continued)

OTHER PUBLICATIONS

Japanese Office Action dated Jul. 21, 2015 corresponding to Japanese Application No. 2015-085601 (with English Translation) 10 pages.

(Continued)

*Primary Examiner* — Joseph G Ustaris
*Assistant Examiner* — Jimmy S Lee
(74) *Attorney, Agent, or Firm* — Xsensus LLP

(57) ABSTRACT

An imaging system includes an imaging unit, a detecting unit, a recording unit, a correcting unit, and a video generating unit. The imaging unit captures images of a plurality of frames. The detecting unit detects a tilt of the imaging unit with respect to a reference direction. The recording unit records time-series data of the tilt detected by the detecting unit. The correcting unit applies tilt correction to an image of each of the frames captured by the imaging unit, based on the time-series data of the tilt recorded by the recording unit and additional information unique to the imaging unit. The video generating unit generates video data based on the image of each of the frames corrected by the correcting unit.

20 Claims, 16 Drawing Sheets

(51) Int. Cl.
 H04N 5/225 (2006.01)
 H04N 5/262 (2006.01)
 G03B 37/00 (2006.01)
(52) U.S. Cl.
 CPC ..... H04N 5/23229 (2013.01); H04N 5/23258 (2013.01); H04N 5/23267 (2013.01); H04N 5/2628 (2013.01); G03B 37/00 (2013.01); H04N 5/2254 (2013.01)
(58) Field of Classification Search
 CPC ............ H04N 5/23267; H04N 5/2628; H04N 5/2254; G03B 37/00; G06T 1/0007
 USPC ......................................................... 348/36
 See application file for complete search history.

(56) References Cited

U.S. PATENT DOCUMENTS

| | | | |
|---|---|---|---|
| RE36,207 E | | 5/1999 | Zimmermann et al. |
| 7,176,960 B1 * | | 2/2007 | Nayar ................... G06T 3/4038 348/207.99 |
| 7,714,936 B1 * | | 5/2010 | Martin .............. G06F 17/30017 348/207.99 |
| 2005/0012745 A1 * | | 1/2005 | Kondo ................... G06T 3/0062 345/427 |
| 2006/0008176 A1 * | | 1/2006 | Igari ....................... G06T 3/4038 382/284 |
| 2007/0002015 A1 | | 1/2007 | Mohri et al. |
| 2007/0014347 A1 * | | 1/2007 | Prechtl ................... H04N 5/232 375/240.01 |
| 2010/0085442 A1 * | | 4/2010 | Yamashita .............. H04N 5/232 348/222.1 |
| 2011/0115879 A1 | | 5/2011 | Homma et al. |
| 2011/0157301 A1 * | | 6/2011 | Saitou ................ H04N 5/23238 348/36 |
| 2012/0098926 A1 * | | 4/2012 | Kweon ..................... G06T 1/00 348/36 |
| 2012/0105578 A1 | | 5/2012 | Ohmiya et al. |
| 2012/0206565 A1 * | | 8/2012 | Villmer ..................... H04N 1/00 348/36 |
| 2012/0281104 A1 * | | 11/2012 | Ohmiya ................. G06T 7/0028 348/208.6 |
| 2013/0057542 A1 | | 3/2013 | Takenaka et al. |
| 2013/0194380 A1 * | | 8/2013 | Jeon ................... H04N 5/23238 348/36 |
| 2013/0235149 A1 | | 9/2013 | Tanaka et al. |
| 2014/0036031 A1 | | 2/2014 | Tanaka et al. |
| 2014/0071227 A1 | | 3/2014 | Takenaka et al. |
| 2014/0078247 A1 | | 3/2014 | Shohara et al. |
| 2014/0152852 A1 | | 6/2014 | Ito et al. |
| 2014/0176542 A1 | | 6/2014 | Shohara et al. |
| 2014/0240454 A1 * | | 8/2014 | Hirata ................ H04N 5/23232 348/38 |
| 2014/0313316 A1 * | | 10/2014 | Olsson ................... H04N 7/183 348/84 |
| 2015/0036944 A1 * | | 2/2015 | Restrepo ................. G06T 3/606 382/264 |
| 2015/0042647 A1 | | 2/2015 | Shohara et al. |
| 2015/0062363 A1 | | 3/2015 | Takenaka et al. |

FOREIGN PATENT DOCUMENTS

| | | |
|---|---|---|
| EP | 0 971 540 A1 | 1/2000 |
| EP | 1 596 272 A1 | 11/2005 |
| JP | 2003-271925 A | 9/2003 |
| JP | 2005-063141 | 3/2005 |
| JP | 2006-059202 | 3/2006 |
| JP | 2009-200985 A | 9/2009 |
| JP | 2010-271675 | 12/2010 |
| JP | 2011-114496 | 6/2011 |
| JP | 4857143 B2 | 1/2012 |
| JP | 5231331 B2 | 7/2013 |
| JP | 2013-214947 | 10/2013 |
| JP | 2014-050039 A | 3/2014 |
| WO | 2011/155161 | 12/2011 |
| WO | 2012/063467 | 5/2012 |
| WO | 2013/133456 | 9/2013 |
| WO | WO 2014/034023 A1 | 3/2014 |

OTHER PUBLICATIONS

International Search Report dated Aug. 4, 2015 in PCT/JP2015/064391 filed May 13, 2015.

Written Opinion dated Aug. 4, 2015 in PCT/JP2015/064391 filed May 13, 2015.

Decision of a Patent Grant with English Translation of a Patent Grant dated Oct. 20, 2015 (5 pages).

Extended European Search Report dated Mar. 27, 2017 in Patent Application No. 15792909.2.

Office Action dated Aug. 2, 2017 in Korean Patent Application No. 10-2016-7031787 (with English translation).

Combined Chinese Office Action and Search Report dated Nov. 2, 2018, in Patent Application No. 201580025123.3 (with English translation), 26 pages.

\* cited by examiner

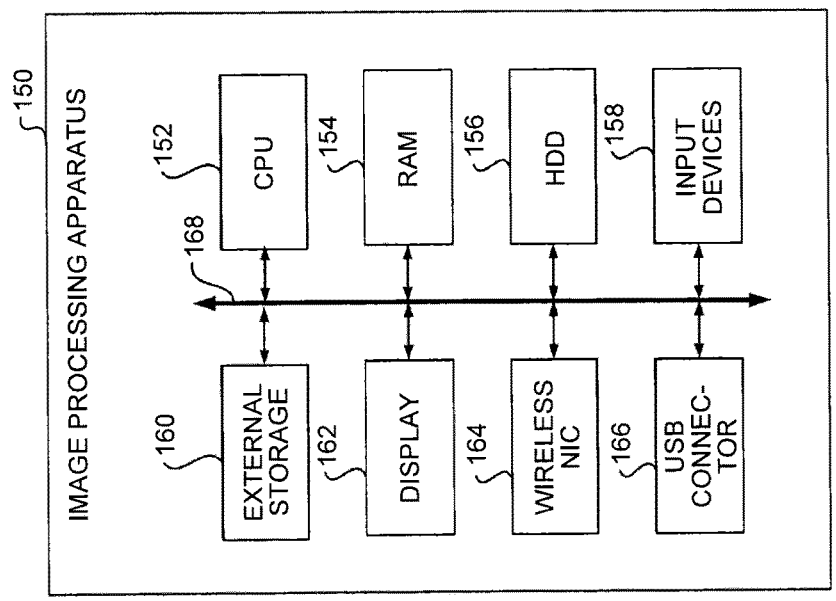
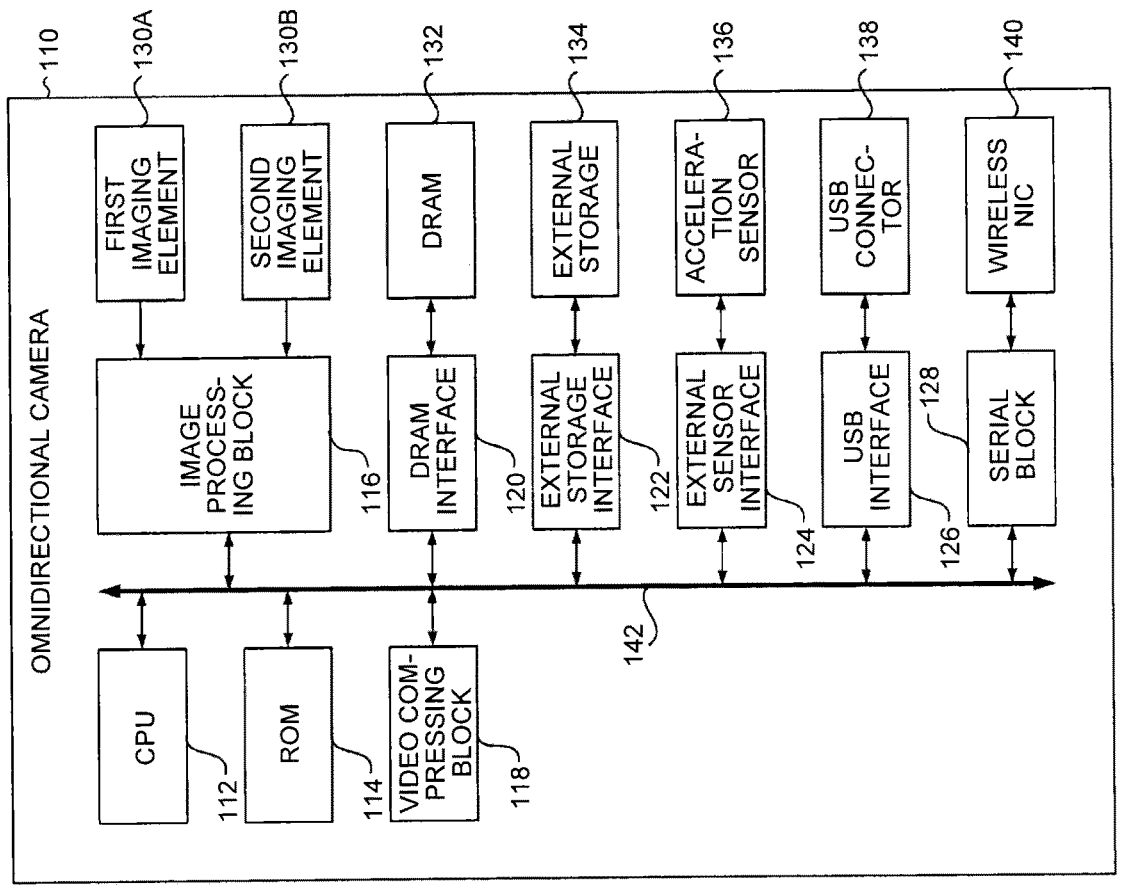

| COORDINATE VALUES AFTER CONVERSION | | COORDINATE VALUES BEFORE CONVERSION | |
|---|---|---|---|
| θ (pix) | φ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

IMAGING SYSTEM, IMAGING APPARATUS, AND SYSTEM

CROSS-REFERENCE TO RELATED APPLICATIONS

This application is a continuation of PCT international Application Ser. No. PCT/JP2015/064391, filed on May 13, 2015, which designates the United States and which claims the benefit of priority from Japanese Patent Applications No. 2014-101058, filed on May 15, 2014, No. 2015-021878, filed on Feb. 6, 2015, and No. 2015-085601, filed on Apr. 20, 2015; the entire contents of which are incorporated herein by reference.

BACKGROUND OF THE INVENTION

1. Field of the Invention

The present invention relates to an imaging system, and more specifically, to an imaging system, an imaging apparatus, and a system for generating an image.

2. Description of the Related Art

In recent years, cameras have been put into practical use that can capture, with one shot, a still image in a hemispherical or full spherical field of view. Handheld-size cameras are also available that can capture an omnidirectional still image. The body of such a handheld size camera is liable to tilt, so that cameras are known that have a function of displaying a captured still image after correcting the tilt thereof in response to photographing when the camera body is tilted.

Japanese Patent Application Laid-open No. 2013-214947 is known as a technique to correct the tilt of the still image. In order to obtain a still image having the correct vertical direction, Patent Document 1 discloses a configuration of a still image capturing device having two fisheye lenses in which a parameter for converting a fisheye image into a regular image is calculated according to a tilt angle detected by an acceleration sensor provided in the still image capturing device for obtaining a tilt from the vertical direction.

In addition to cameras for still images, cameras have also been developed that can store therein a wide range as a video image using an ultra-wide-angle lens.

Among cameras for capturing a video image according to conventional techniques, cameras are known that have a function to reduce blurring associated with hand movement. However, when the video image is captured while a camera body is tilted, the vertical direction thereof differs from the zenith direction of a video image capturing device, thereby causing a problem. Specifically, when a viewer views the video image captured while the camera body is tilted, if a field of view is changed while the vertical direction is held coincident with the original direction, a complex rotation occurs, and thus may give the viewer uncomfortable feeling such as 3D sickness. The conventional technique of Patent Document 1 is a technique for dealing with still images, and is not a technique that enables creation of video images having the correct vertical direction. Due to this problem, development of a technique is desired with which an omnidirectional video having the correct vertical direction is generated regardless of the tilt state of the camera.

Therefore, there is a need for an imaging system, an imaging apparatus, and a system that enable to detect a tilt of an image capturing unit with respect to a reference direction, and generate video data that is corrected in tilt according to the detected tilt.

SUMMARY OF THE INVENTION

It is an object of the present invention to at least partially solve the problems in the conventional technology.

According to an embodiment, an imaging system includes an imaging unit, a detecting unit, a recording unit, a correcting unit, and a video generating unit. The imaging unit captures images of a plurality frames. The detecting unit detects a tilt of the imaging unit with respect to a reference direction. The recording unit records time-series data of the tilt detected by the detecting unit. The correcting unit applies tilt correction to an image of each of the frames captured by the imaging unit, based on the time-series data of the tilt recorded by the recording unit and additional information unique to the imaging unit. The video generating unit generates video data based on the image of each of the frames corrected by the correcting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2A and 2B are hardware configuration diagrams of the omnidirectional video imaging system according to the embodiment;

DETAILED DESCRIPTION OF THE PREFERRED EMBODIMENTS

An embodiment will be described below. The present invention is, however, not limited to the embodiment to be described below. The following embodiment will be described using, as an example of an imaging apparatus and an imaging system, an omnidirectional camera that includes an imaging body including two fisheye lenses in optical systems and an omnidirectional video imaging system that includes the omnidirectional camera and an image processing apparatus separated from the omnidirectional camera.

Overall Configuration

Figure 1:
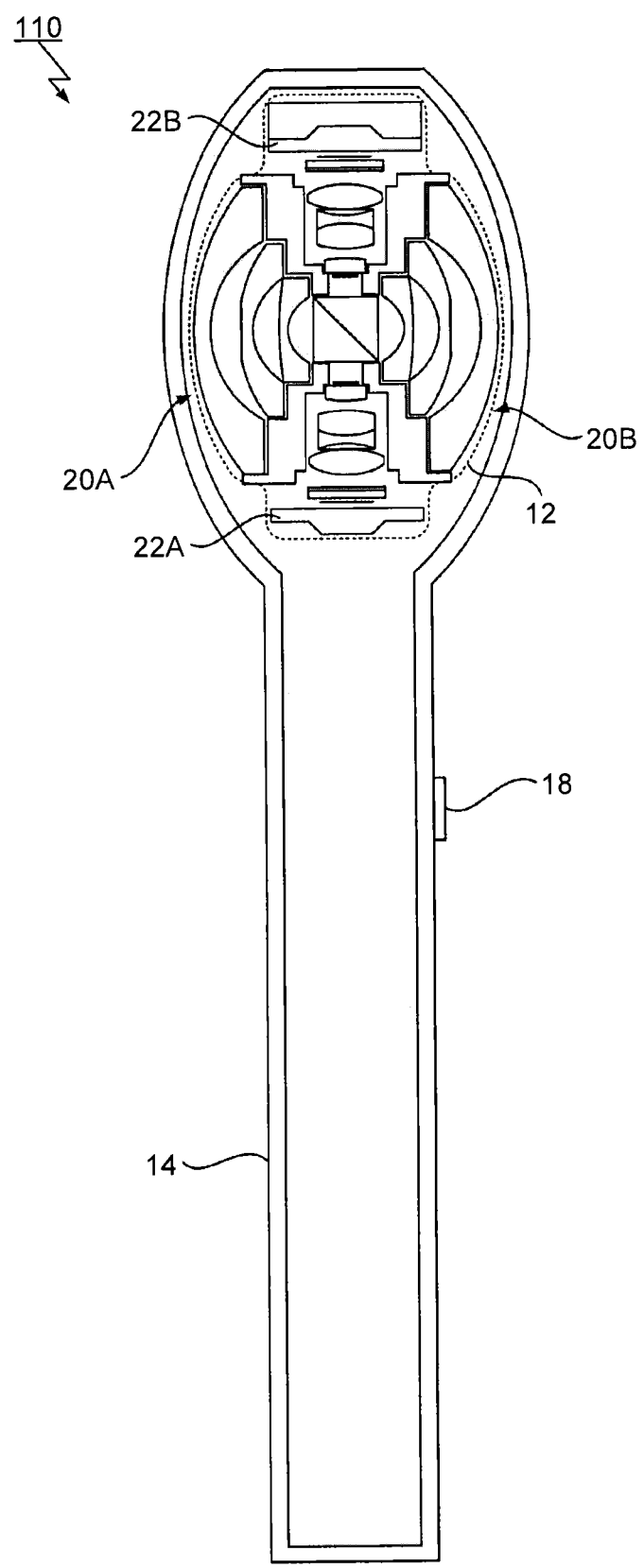
FIG. 1 is a sectional view of an omnidirectional camera constituting an omnidirectional video imaging system according to an embodiment of the present invention.

The following describes the overall configuration of the omnidirectional video imaging system according to the present embodiment, with reference to FIGS. 1, 2A, and 2B. FIG. 1 is a sectional view of an omnidirectional camera 110 constituting an omnidirectional video imaging system 100 according to the present embodiment. The omnidirectional camera 110 illustrated in FIG. 1 includes an imaging body 12, a housing 14 holding the imaging body 12 and components such as a controller and a battery, and a shutter button 18 provided on the housing 14.

The imaging body 12 illustrated in FIG. 1 includes two imaging forming optical systems 20A and 20B and two imaging elements 22A and 22B, such as charge-coupled device (CCD) sensors or complementary metal oxide semiconductor (CMOS) sensors. Each of the imaging forming optical systems 20 is configured as a fisheye lens consisting of, for example, seven elements in six groups. In the embodiment illustrated in FIG. 1, the above-mentioned fisheye lens has a full angle of view of larger than 180 degrees (=360 degrees/n, where the number of optical systems is n=2), preferably has an angle of view of 185 degrees or larger, and more preferably has an angle of view of 190 degrees or larger. Such a wide-angle combination of one of the imaging forming optical systems 20 and one of the imaging elements 22 is referred to as a wide-angle imaging optical system.

Optical elements (lenses, prisms, filters, and aperture stops) of the two imaging forming optical systems 20A and 20B are set to have positional relations with the imaging elements 22A and 22B. More specifically, positioning is made so that the optical axis of the optical elements of each of the imaging forming optical systems 20A and 20B is positioned at the central part of the light receiving region of corresponding one of the imaging elements 22 orthogonally to the light receiving region, and so that the light receiving region serves as the imaging surface of corresponding one of the fisheye lenses.

In the embodiment illustrated in FIG. 1, the imaging forming optical systems 20A and 20B have the same specifications, and are combined in directions reverse to each other so that the optical axes thereof coincide with each other. The imaging elements 22A and 22B covert distributions of received light into image signals, and sequentially output image frames to an image processing unit on the controller. Although details will be described later, images captured by the respective imaging elements 22A and 22B are transferred to an image processing apparatus 150 and are combined so as to generate an image over a solid angle of 4π steradian (hereinafter, referred to as an "omnidirectional image"). The omnidirectional image is obtained by photographing all directions viewable from a photographing location. An omnidirectional video is obtained from successive frames of the omnidirectional images. While the description assumes that the embodiment described herein generates the omnidirectional images and the omnidirectional video, the embodiment may generate what are called panoramic images and what is called a panoramic video that are obtained by photographing 360 degrees only in a horizontal plane.

FIG. 2A illustrates the hardware configuration of the omnidirectional camera 110 constituting the omnidirectional video imaging system 100 according to the present embodiment. The omnidirectional camera 110 includes a central processing unit (CPU) 112, a read-only memory (ROM) 114, an image processing block 116, a video compressing block 118, a dynamic random access memory (DRAM) 132 connected via a DRAM interface 120, and an acceleration sensor 136 connected via an external sensor interface 124.

The CPU 112 controls operations of components, and overall operations, of the omnidirectional camera 110. The ROM 114 stores therein a control program described in a code decodable by the CPU 112 and various parameters. The image processing block 116 is connected to two imaging elements 130A and 130B (corresponding to the imaging elements 22A and 22B in FIG. 1), and receives image signals of images captured by the respective imaging elements 130A and 130B. The image processing block 116 includes, for example, an image signal processor (ISP), and applies, for example, shading correction, Bayer interpolation, white balance correction, and gamma correction to the image signals received from the imaging elements 130A and 130B.

The video compressing block 118 is a codec block for compressing and expanding a video such as that in MPEG-4 AVC/H.264 format. The DRAM 132 provides a storage area for temporarily storing data therein when various types of signal processing and image processing are applied. The acceleration sensor 136 detects acceleration components along three axes. The detected acceleration components are used for detecting the vertical direction to apply zenith correction to the omnidirectional image.

The omnidirectional camera 110 also includes an external storage interface 122, a Universal Serial Bus (USB) interface 126, and a serial block 128. The external storage interface 122 is connected to an external storage 134. The external storage interface 122 controls reading and writing to an external storage 134, such as a memory card inserted in a memory card slot. The USB interface 126 is connected to a USB connector 138. The USB interface 126 controls USB communication with an external device, such as a personal computer, connected via the USB connector 138. The serial block 128 controls serial communication with an external device, such as a personal computer, and is connected to a wireless network interface card (NIC) 140.

When power is turned on by operation of a power switch, the control program mentioned above is loaded into the main memory. The CPU 112 follows the program read into the main memory to control operations of the parts of the device, and temporarily store data required for the control, in the memory. This operation implements functional units and processes of the omnidirectional camera 110, which are to be described later.

FIG. 2B illustrates the hardware configuration of the image processing apparatus 150 constituting the omnidirectional video imaging system 100 according to the present embodiment. The image processing apparatus 150 illustrated in FIG. 2B includes a CPU 152, a RAM 154, a hard disk drive (HDD) 156, input devices 158 such as a mouse and a keyboard, an external storage 160, a display 162, a wireless NIC 164, and a USB connector 166.

The CPU 152 controls operations of components, and overall operations, of the image processing apparatus 150. The RAM 154 provides the work area of the CPU 152. The HDD 156 stores therein an operating system and a control program, such as an application, that executes processes in the image processing apparatus 150 according to the present embodiment, each of the operating system and the control program being written in a code decodable by the CPU 152.

The input devices 158 are input devices, such as a mouse, a keyboard, a touchpad, and a touchscreen, and provide a user interface. The external storage 160 is a removable recording medium mounted, for example, in a memory card slot, and records various types of data, such as image data in a video format and still image data. The display 162 displays an omnidirectional video reproduced in response to a user operation, on the screen. The wireless NIC 164 establishes a connection for wireless communication with an external device, such as the omnidirectional camera 110. The USB connector 166 provides a USB connection to an external device, such as the omnidirectional camera 110.

When power is applied to the image processing apparatus 150 and the power thereof is turned on, the control program is read from a ROM or the HDD 156, and loaded in the RAM 154. The CPU 152 follows the control program read into the RAM 154 to control operations of the parts of the apparatus, and temporarily store data required for the control, in the memory. This operation implements functional units and processes of the image processing apparatus 150, which are to be described later.

Omnidirectional Video Imaging and Recording Function

Figure 3:
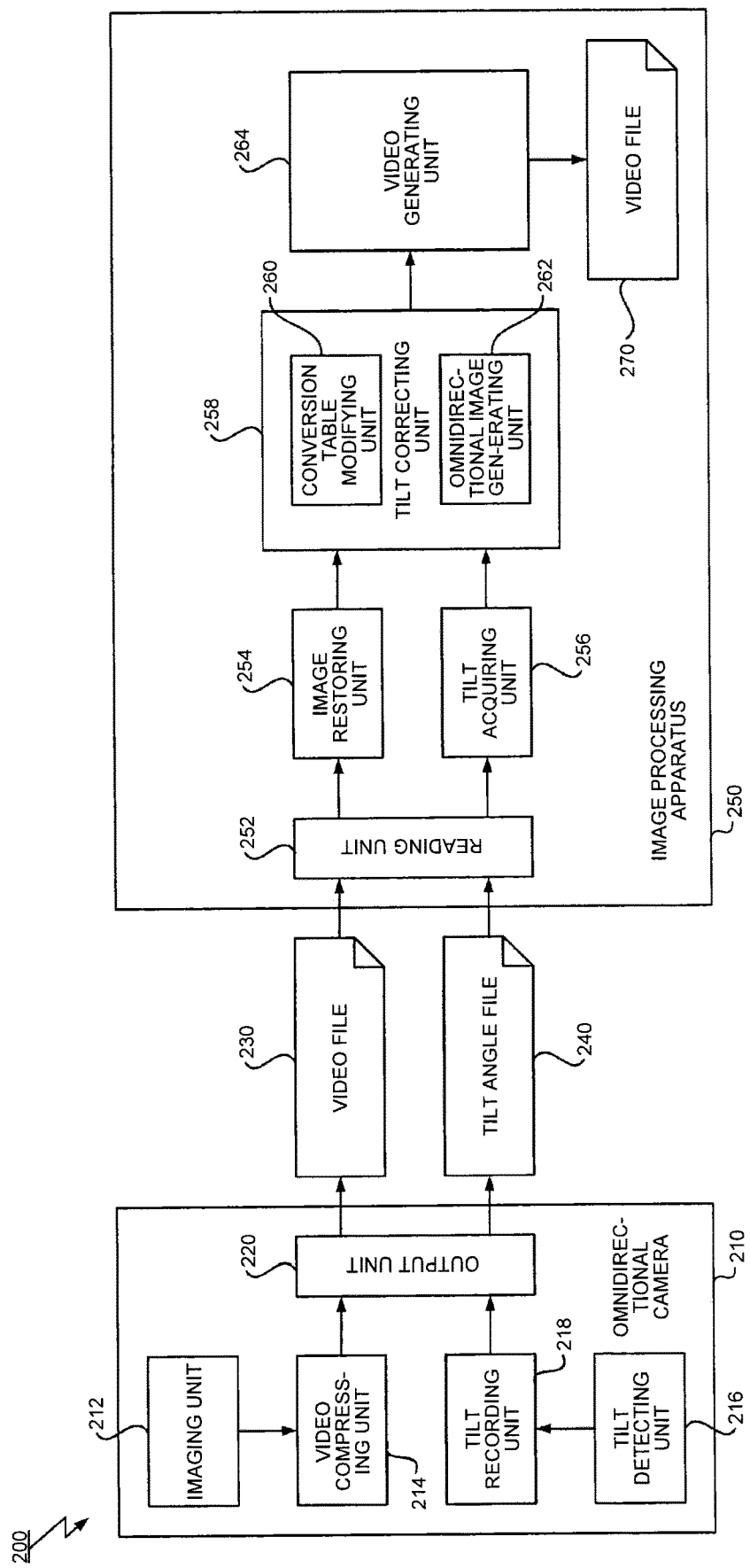
FIG. 3 is a main functional block diagram related to an omnidirectional video imaging and recording function implemented in the omnidirectional video imaging system according to the embodiment.

The following describes an omnidirectional video imaging and recording function provided by the omnidirectional video imaging system 100 according to the present embodiment, with reference to FIGS. 3 to 16. FIG. 3 illustrates a main functional block 200 related to the omnidirectional video imaging and recording function implemented in the omnidirectional video imaging system 100 according to the present embodiment.

As illustrated in FIG. 3, a functional block 210 of the omnidirectional camera 110 includes an imaging unit 212, a video compressing unit 214, a tilt detecting unit 216, a tilt recording unit 218, and an output unit 220; and a functional block 250 of the image processing apparatus 150 includes a reading unit 252, an image restoring unit 254, a tilt acquiring unit 256, a tilt correcting unit 258, and a video generating unit 264.

The functional block of the omnidirectional camera 110 will first be described. The imaging unit 212 includes the two wide-angle imaging optical systems described above, and controls the two imaging elements 130A and 130B to sequentially capture images of successive frames. An image captured by each of the imaging elements 130A and 130B is a fisheye image including substantially a hemisphere of a full celestial sphere in the field of view, and constitutes a partial image of the omnidirectional image. Hereinafter, the image captured by each of the imaging elements 130A and 130B may be referred to as a partial image.

The video compressing unit 214 includes the video compressing block 118, and compresses the successive frames imaged by the imaging unit 212 into image data in a predetermined video format. Examples of the video compression format is not limited, but include various video compression formats, such as H.264/MPEG-4 Advanced Video Coding (AVC), H.265/High Efficiency Video Coding (HEVC), Motion Joint Photographic Experts Group (JPEG), and Motion JPEG 2000.

The Motion JPEG-based formats are formats for expressing a video as successive still images. A high-quality video can be obtained by employment of one of these formats. The H.264/MPEG-4 AVC format and the H.265/HEVC format allow compression along the time axis, and thereby provide a high processing efficiency, thus allowing to ease requirements on the delay in writing to the external storage. The omnidirectional camera 110 that is held by hand is required to be compact and low-cost, and thereby can hardly include high-performance hardware. A preferred embodiment thus can preferably employ the H.264/MPEG-4 AVC format or the H.265/HEVC format that allows compression along the time axis and reduction in the bit rate.

In the embodiment described herein, the imaging unit 212 independently outputs two fisheye images that are captured by the two imaging elements 130A and 130B at the same timing, and the video compressing unit 214 independently generates two respective pieces of image data in the video format from frames of the independent two fisheye images. The expression format of the image data is not particularly limited. In another embodiment, the imaging unit 212 can a single image formed by joining the two fisheye images captured by the two imaging elements 130A and 130B, and the video compressing unit 214 compresses the frames of images including the two fisheye images into the image data in the video format.

The tilt detecting unit 216 includes the acceleration sensor 136, and detects a tilt of the omnidirectional camera 110 with respect to a predetermined reference direction. The predetermined reference direction is typically the vertical direction, which is a direction in which a gravitational acceleration acts. The tilt detecting unit 216 outputs signals of acceleration components of the three-axis acceleration sensor 136 to the tilt recording unit 218. The tilt recording unit 218 samples the signals of acceleration components received from the tilt detecting unit 216 in synchronization with the frames of the image data in the video format, and obtains tilt angles with respect to the predetermined reference direction. The tilt recording unit 218 then records the tilt angles as time-series data at the same rate as the frame rate of the image data in the video format.

In the embodiment described herein, the description assumes that the tilt angles correspond one-to-one to the frames in the image data in the video format, and the frames and the tilt angles are stored in synchronization with each other. The rate of storing the tilt angles, however, need not be the same as the frame rate, and if not the same, resampling only needs to be made at the frame rate to obtain the tilt angles corresponding one-to-one to the frames.

The DRAM 132 temporarily holds the two respective pieces of image data in the video format generated by the video compressing unit 214 and the tilt angle data recorded by the tilt recording unit 218, which have been described above. When the size of each of the two respective pieces of image data in the video format and the tilt angle data held in the DRAM 132 reaches an appropriate write size, the output unit 220 writes the two respective pieces of image data and the tilt angle data as two video files 230 and a tilt angle file 240, respectively, into the external storage 134. After the photographing is finished, the two video files 230 and the tilt angle file 240 are closed, whereby the processing performed by the omnidirectional camera 110 is ended.

The external storage 134 is dismounted from the omnidirectional camera 110 and mounted onto the image processing apparatus 150. The image processing apparatus 150 will subsequently be described. The reading unit 252 reads the two video files 230 and the tilt angle file 240 written by the omnidirectional camera 110, from the external storage 160 mounted on the image processing apparatus 150. The read two video files 230 are sent to the image restoring unit 254. The read tilt angle file 240 is sent to the tilt acquiring unit 256. Instead of being loaded and unloaded with the external storage 134, the image processing apparatus 150 may read the two video files 230 and the tilt angle file 240 written by the omnidirectional camera 110 from the external storage 134 mounted on the omnidirectional camera 110 via the USB interface included in the omnidirectional camera 110.

The image restoring unit 254 uses a predetermined codec corresponding to each of the read video files 230 to decode each of the read video files 230, and thereby restores the frames of still images constituting the video to supply the frames to the tilt correcting unit 258. The tilt acquiring unit 256 obtains, from the read tilt angle file 240, the tilt angles corresponding to the respective frames restored by the image restoring unit 254, and supplies the tilt angles to the tilt correcting unit 258.

The tilt correcting unit 258 corrects the tilt of the respective frames of still images restored by the image restoring unit 254, based on the tilt angles corresponding to the respective frames received from the tilt acquiring unit 256, and converts the fisheye images into the omnidirectional image. The tilt correcting unit 258 includes, more in detail, a conversion table modifying unit 260 and an omnidirectional image generating unit 262.

The image processing apparatus 150 prepares in advance a conversion table for generating the omnidirectional image by converting the two fisheye images (which are transferred as the frames of the video file to the image processing apparatus) captured by the two imaging elements 130A and 130B into those in a spherical coordinate system. The conversion table is data created in advance by the manufacturer or the like according to a predetermined projection model, based on, for example, design data of the respective lens optical systems, and is data prepared for converting the fisheye images into the omnidirectional image on the assumption that the direct upward direction of the omnidirectional camera 110 coincides with the vertical line. In the embodiment described herein, if the omnidirectional camera 110 is tilted such that the direct upward direction does not coincide with the vertical line, the conversion data is modified according to the tilt so as to reflect the zenith correction.

Figure 5A:
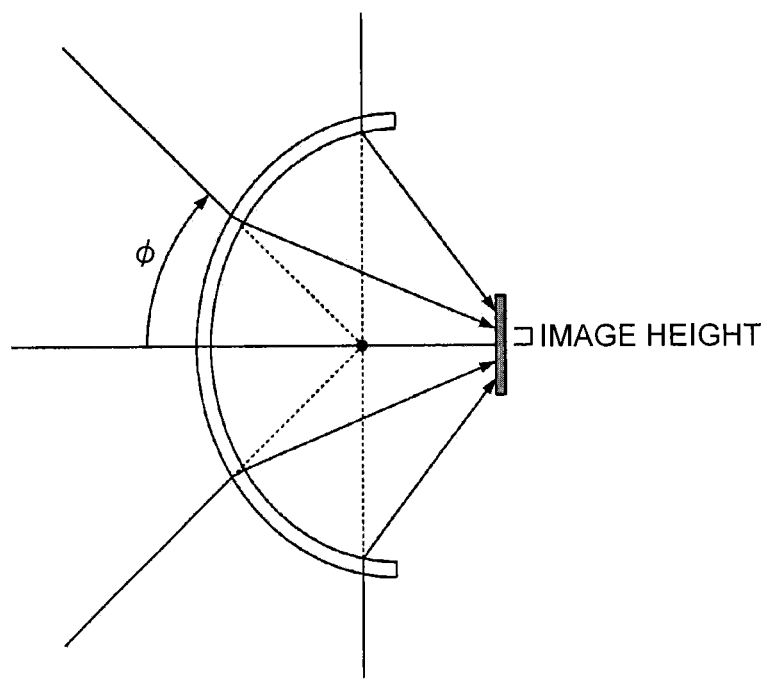
FIGS. 5A and 5B are diagrams explaining a projection relation in the omnidirectional camera using a fisheye lens in the embodiment.
Figure 5B:
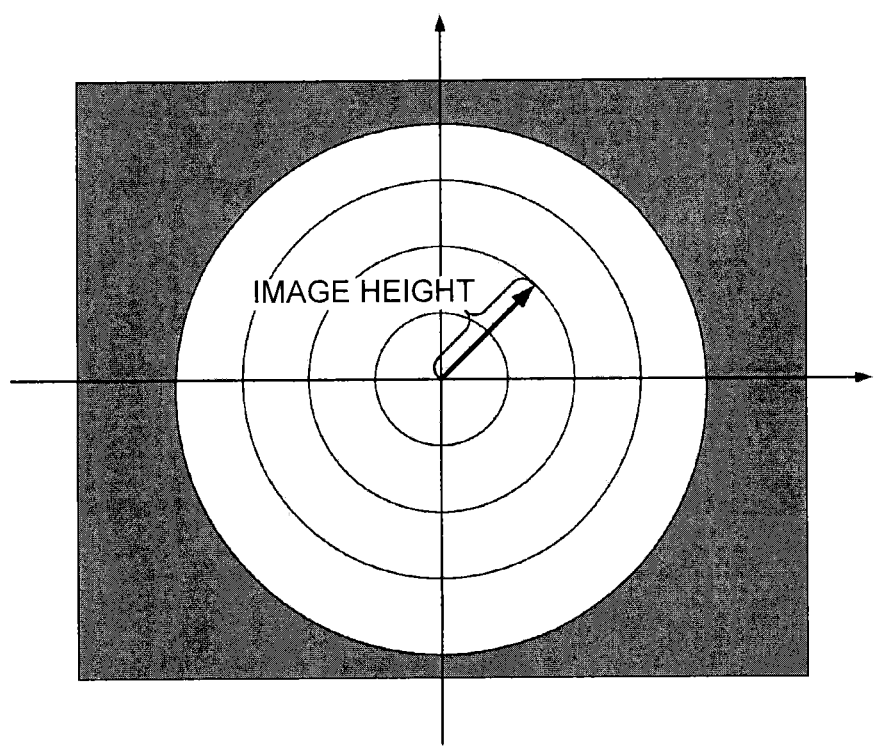
Figure 10A:
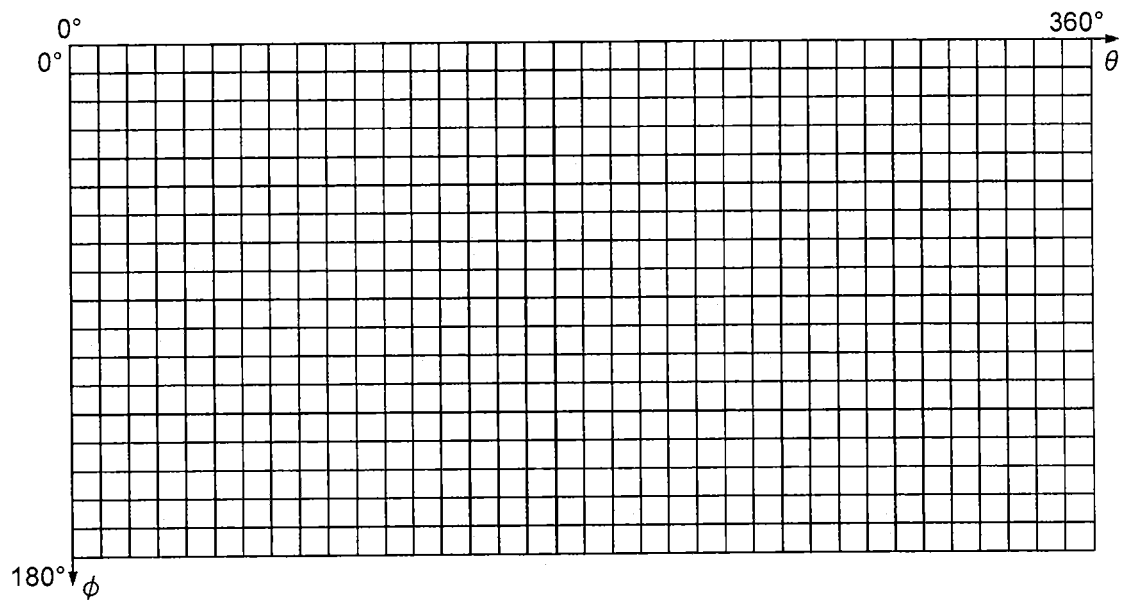
FIG. 10A is a diagram explaining a case in which the omnidirectional image format is represented by a flat surface.
Figure 10B:
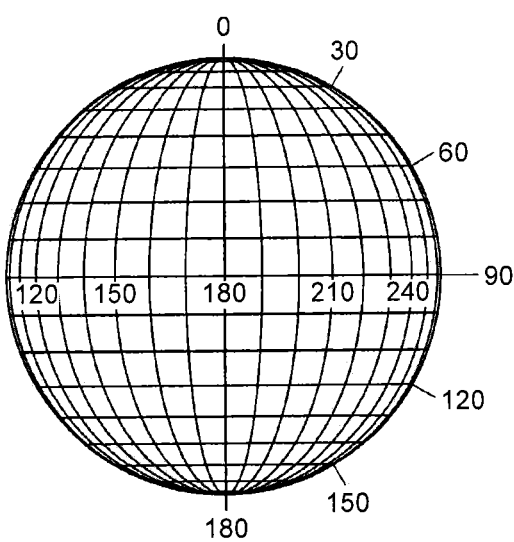
FIG. 10B is a diagram explaining a case in which the omnidirectional image format is represented by a spherical surface.
Figure 11:
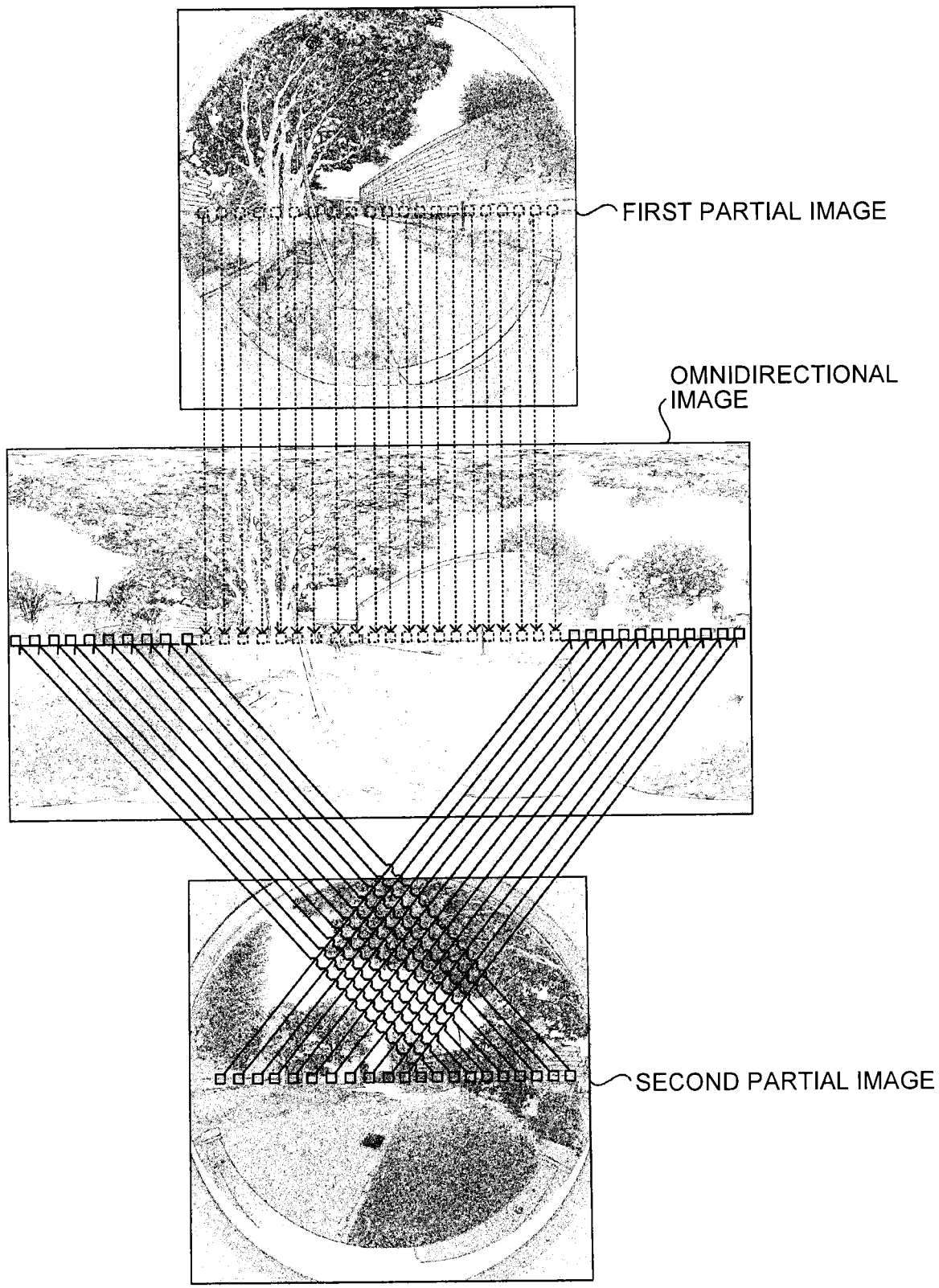
FIG. 11 is a diagram explaining images obtained by imaging elements in the omnidirectional camera and an image generated by the image processing apparatus, in the embodiment.

The partial images included in the respective pieces of image data in the video format are captured by the two-dimensional imaging elements, for each of which the light receiving region provides an amount of area, and are image data expressed in a planar coordinate system (x,y) (refer to FIG. 5B and a first partial image and a second partial image illustrated in FIG. 11). Compared with these images, the corrected image after being subjected to the zenith correction using the conversion table is image data in an omnidirectional image format expressed in the spherical coordinate system (which is a polar coordinate system having a radius of 1 and two deflection angles θ and φ) (refer to FIGS. 10A and 10B and the omnidirectional image illustrated in FIG. 11).

The conversion table may be stored in the video file and obtained when the video file is read, or may be downloaded in advance from the omnidirectional camera 110 to the image processing apparatus 150. The conversion table may alternatively be obtained as follows: a conversion table serving as a common base for all individual omnidirectional cameras is prepared in advance in the image processing apparatus; difference data for obtaining a conversion table unique to the individual omnidirectional camera 110 is written into the video file; and a unique conversion table is restored when the video file is read.

According to the acquired tilt angles, the conversion table modifying unit 260 modifies the conversion table described above so that the zenith direction of the image (direction pointing a point directly above an observer) coincides the detected vertical line (straight line formed in the vertical direction in which a gravitational force acts). As a result, by converting the fisheye images into the omnidirectional image using the modified conversion table, the omnidirectional image is generated so as to reflect the correction that aligns the zenith direction with the vertical line corresponding to the tilt. The omnidirectional image generating unit 262 uses the conversion table modified by the conversion table modifying unit 260 to convert the two partial images corresponding to each of the restored frames into the omnidirectional image reflecting the zenith correction, and outputs each frame of the omnidirectional images to the video generating unit 264. The conversion table modifying unit 260 and the omnidirectional image generating unit 262 correct the images so that the zenith direction of the image of each of the frames after the correction coincides with the vertical direction.

Based on the omnidirectional image of each of the frames corrected by the tilt correcting unit 258, the video generating unit 264 encodes the frames into a predetermined video compression format to generate final video data, and writes the final video data as a video file 270. The video file 270 is video data of the omnidirectional images. The predetermined video compression format may be any format including the formats described above.

When the video file is viewed, images in a certain field of view specified in the full celestial sphere are reproduced and displayed by a display application, based on the generated video data. In the generated video data, the zenith direction of the images is fixed to the vertical line. Due to this, when a displayed field of view is changed while the video data is viewed, only a rotation following the change in the field of view occurs. As a result, a complex rotation involving changes in field of view and tilt is reduced, so that the possibility of uncomfortable feeling such as 3D sickness can be reduced.

Figure 4:
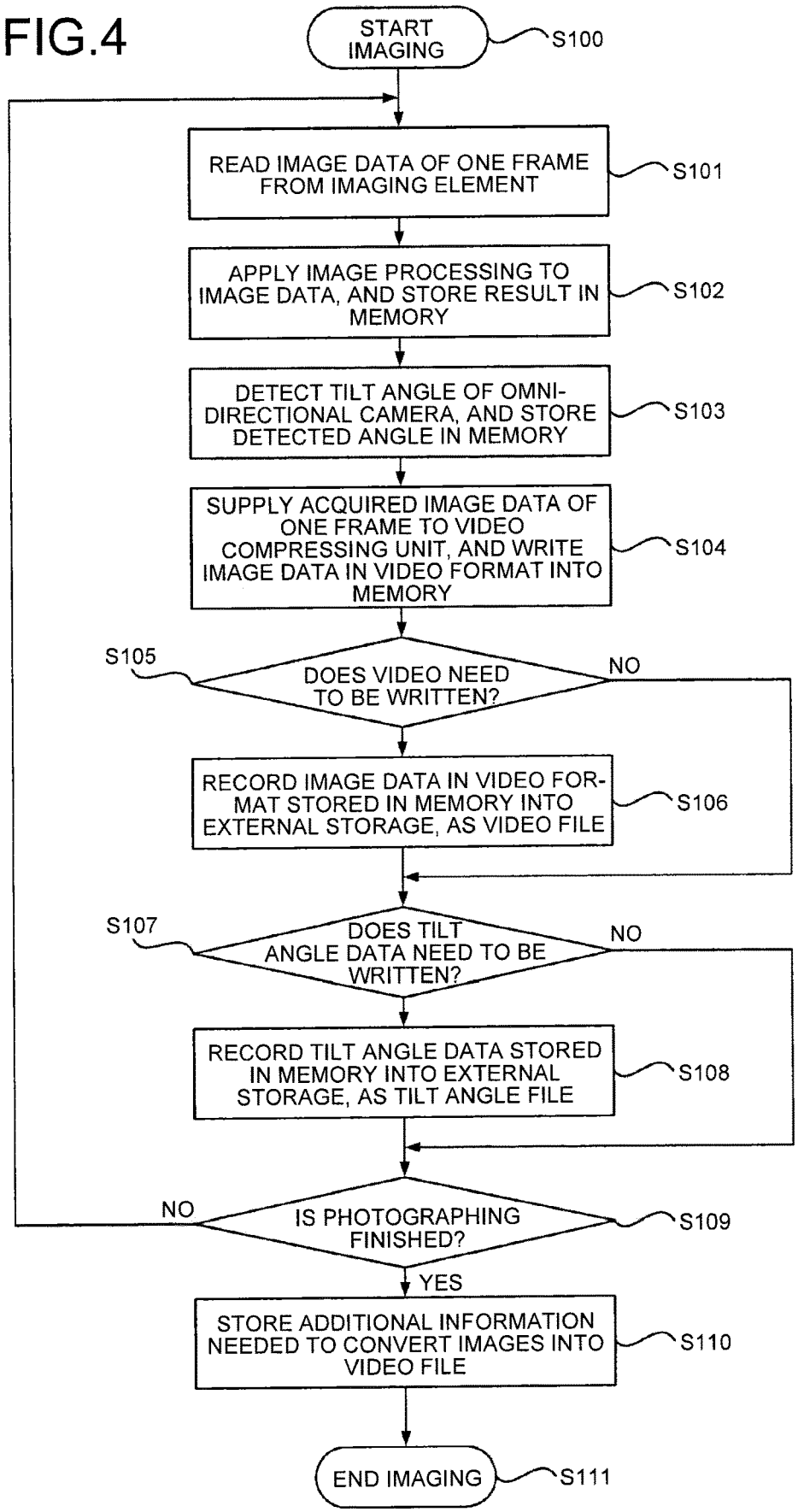
FIG. 4 is a flowchart illustrating imaging processing performed by the omnidirectional camera constituting the omnidirectional video imaging system according to the embodiment.
Figure 7:
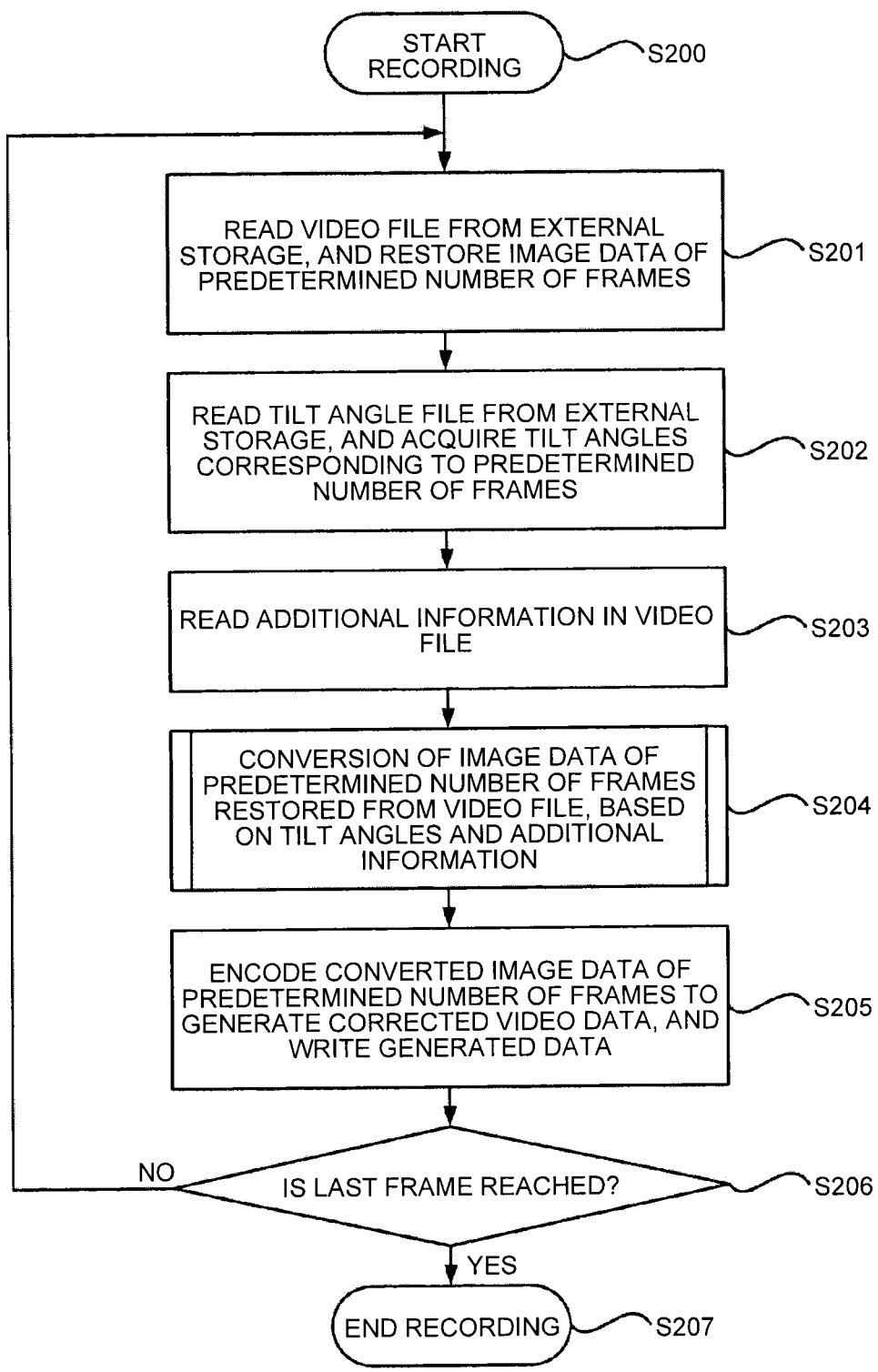
FIG. 7 is a flowchart illustrating recording processing performed by an image processing apparatus constituting the omnidirectional video imaging system according to the embodiment.

The following separately describes details of the processing performed by the omnidirectional camera 110 and the processing performed by the image processing apparatus 150 according to the present embodiment, with reference to FIGS. 4 and 7. FIG. 4 is a flowchart illustrating the imaging processing performed by the omnidirectional camera 110 constituting the omnidirectional video imaging system 100 according to the present embodiment. The processing illustrated in FIG. 4 starts from Step S100 in response to a command, such as pressing a video taking button of the omnidirectional camera 110, to start the imaging. At Step S101, the imaging unit 212 of the omnidirectional camera 110 reads two pieces of image data of one frame from the imaging elements 130A and 130B.

FIGS. 5A and 5B are diagrams explaining a projection relation in the omnidirectional camera 110 using one of the fisheye lenses. In the present embodiment, an image photographed with one fisheye lens is an image obtained by photographing an orientation range of substantially a hemisphere from a photographing location. As illustrated in FIG. 5A, the fisheye lens generates the image having an image height h corresponding to an angle of incidence φ with respect to the optical axis. The relation between the image height h and the angle of incidence φ is determined by a projection function according to the predetermined projection model. The projection function varies depending on the characteristic of the fisheye lens. For a fisheye lens based on a projection model called an equidistance projection scheme, the projection function is represented by the following expression (1), where f is a focal length.

$$h = f \times \phi \quad (1)$$

Other examples of the projection model described above include a central projection scheme (h=f·tan φ) a stereographic projection scheme (h=2f·tan(φ/2)), an equisolid angle projection scheme (h=2f·sin(φ/2)), and an orthographic projection scheme (h=f·sin φ). In any of the schemes, the image height h of the formed image is determined corresponding to the angle of incidence φ relative to the optical axis and to the focal length f. The present embodiment employs a configuration of what is called a circular fisheye lens that has an image circle diameter shorter than a diagonal line of the image. As illustrated in FIG. 5B, the partial image obtained from this lens is a planar image including the entire image circle obtained by projecting the photographed range of substantially a hemisphere.

In the embodiment described herein, the two pieces of image data of one frame is two planar images (the first partial image and the second partial image of FIG. 11) including the entire image circle that are captured by the two imaging elements 130A and 130B and are obtained by projecting the photographed range of substantially a hemisphere.

Referring again to FIG. 4, at Step S102, the omnidirectional camera 110 applies image processing to the two pieces of image data of one frame captured by the imaging unit 212, and stores the result in the DRAM 132. First, the omnidirectional camera 110 applies, for example, optical black correction, defective pixel correction, linear correction, and shading processing to Bayer raw images acquired from the imaging elements 130A and 130B. Then, the omnidirectional camera 110 applies white balance processing, gamma correction, Bayer interpolation, YUV conversion, edge enhancement processing, and color correction.

At Step S103, the tilt recording unit 218 of the omnidirectional camera 110 detects a tilt angle in synchronization with the photographed frame, and stores the tilt angle in the memory.

Figure 6:
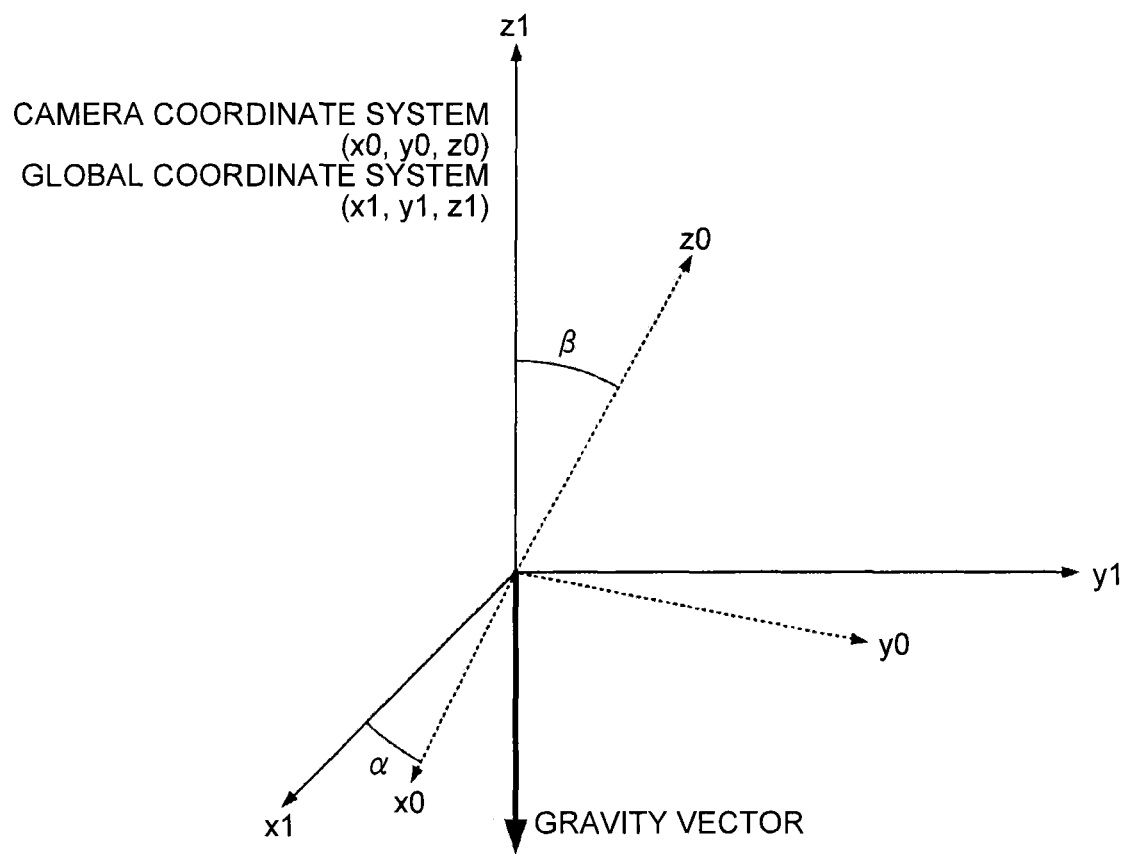
FIG. 6 is a schematic diagram explaining a tilt of the omnidirectional camera in the embodiment.

FIG. 6 is a schematic diagram explaining the tilt of the omnidirectional camera 110 in the present embodiment. In FIG. 6, the vertical direction coincides with the z-axis of the x, y, and z three-dimensional orthogonal coordinate axes in a global coordinate system. When this direction coincides with the direct upward direction of the omnidirectional camera 110 illustrated in FIG. 6, it means that the camera is not tilted. The omnidirectional camera 110 is tilted when this direction does not coincide with the direct upward direction thereof.

Specifically, a tilt angle from the gravity vector (hereinafter, called a tilt angle β) and an inclination angle α in the xy-plane (hereinafter, called a tilt angle α) are obtained from the following expressions (2) using an output of the acceleration sensor. In the expressions, Ax is a value of the x0-axis direction component of the output of the acceleration sensor 136 in a camera coordinate system; Ay is a value of the y0-axis direction component of the output of the acceleration sensor 136 in the camera coordinate system; and Az is a value of the z0-axis direction component of the output of the acceleration sensor 136 in the camera coordinate system. At Step S103, the tilt angles α and β are obtained from the values of the components in the respective axis directions of the output of the acceleration sensor 136, and the results are stored.

$$\alpha = \operatorname{Arctan}\left(\frac{Ax}{Ay}\right) \quad (2)$$

$$\beta = \operatorname{Arccos}\left(\frac{Az}{\sqrt{Ax^2 + Ay^2 + Az^2}}\right)$$

Referring again to FIG. 4, at Step S104, the omnidirectional camera 110 supplies the acquired two pieces of image data of one frame to the video compressing unit 214, and writes the image data in the video format into the memory. At Step S105, the omnidirectional camera 110 determines whether the video needs to be written. If it is determined that the predetermined write size is reached and thus the video needs to be written (Yes at Step S105), the process branches to Step S106. At Step S106, the output unit 220 of the omnidirectional camera 110 records the two pieces of image data in the video format stored in the DRAM 132 into the external storage 134, as two video files. If it is determined that the predetermined write size has not been reached and thus the video need not be written (No at Step S105), the process directly proceeds to Step S107.

At Step S107, the omnidirectional camera 110 determines whether the tilt angle data needs to be written. If it is determined that the predetermined write size is reached and thus the tilt angle data needs to be written (Yes at Step S107), the process branches to Step S108. At Step S108, the output unit 220 of the omnidirectional camera 110 records the tilt angle data stored in the DRAM 132 into the external storage 134, as a tilt angle file. If it is determined that the predetermined write size has not been reached and thus the tilt angle data need not be written (No at Step S107), the process directly proceeds to Step S109.

At Step S109, the omnidirectional camera 110 determines whether the photographing is finished. If it is determined that the user has not commanded to finish the photographing and the photographing is not finished (No at Step S109), the process loops back to Step S101, and the next frame is processed. If it is determined that the command to finish the photographing has been received from the user and the photographing is finished (Yes at Step S109), the process proceeds to Step S110.

At Step S110, the omnidirectional camera 110 writes, into the video file, additional information needed for the image processing apparatus 150 to convert the images, and at Step S111, the imaging processing performed by the omnidirectional camera 110 ends. The additional information needed to convert the images is data for the image processing apparatus 150 to restore the conversion table conforming to the particular omnidirectional camera 110 that has photographed the video. The additional information may be the conversion table itself or the difference data for a conversion table of each individual omnidirectional camera corresponding to the standard conversion table, or may be identification information for identifying a relevant conversion table out of a plurality of predefined conversion tables.

FIG. 7 is a flowchart illustrating recording processing performed by the image processing apparatus 150 constituting the omnidirectional video imaging system 100 according to the present embodiment. In the application for generating the omnidirectional video on the image processing apparatus 150, a video file and a tilt angle file are specified; a command is issued to start encoding and recording; and in response to the command, the recording processing illustrated in FIG. 7 starts from Step S200.

In the image processing apparatus 150, at Step S201, the reading unit 252 reads two video files from the external storage 160, and the image restoring unit 254 restores two pieces of image data of a predetermined number of frames. In the image processing apparatus 150, at Step S202, the reading unit 252 reads the tilt angle file from the external storage 160, and the tilt acquiring unit 256 acquires tilt angles corresponding to respective ones of the predetermined number of frames restored above.

Figure 8:
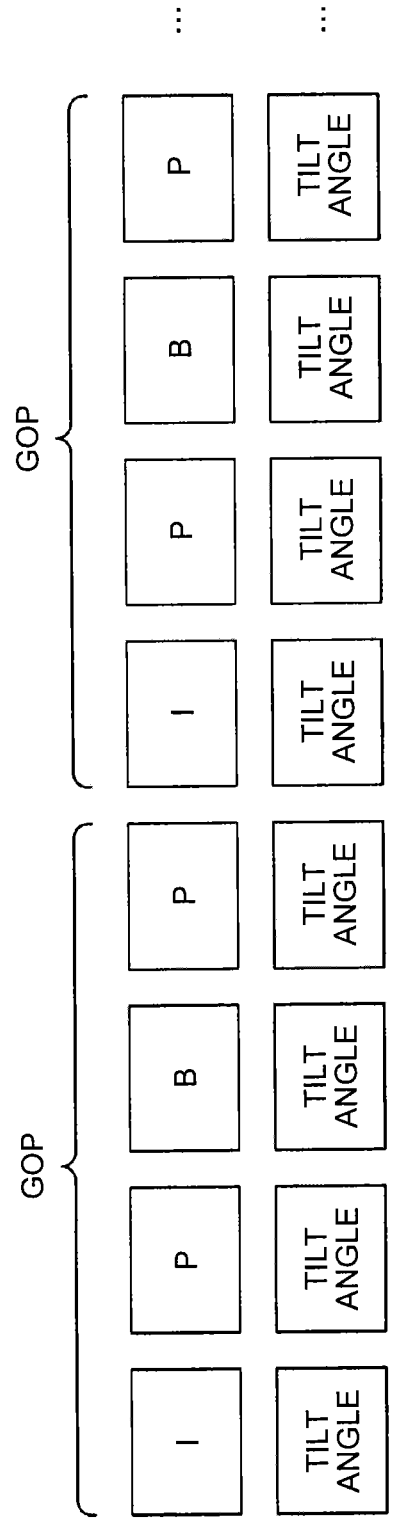
FIG. 8 is a diagram explaining a configuration in which only images of some frames constituting a video are loaded in a RAM when a correction is made in a preferred embodiment of the present invention.

Loading all the frames constituting the video file 230 into the RAM 154 results in use of an excessive amount of memory. To avoid this, a preferred embodiment can be configured such that, when the correction is made, only the image data and the tilt angle data of some frames based on a starting frame of the frames constituting the entire video file are loaded into the RAM 154. If a format, such as the MPEG-4 AVC format, allowing compression along the time axis is employed, the frames are efficiently loaded into the memory in the unit of group of pictures (GOP), as illustrated in FIG. 8, or in another unit referred to according to the same concept as that of the GOP.

The GOP includes an I picture, a P picture, and a B picture. The I picture is a picture that serves as a start point of reproduction and is coded by intra-frame predictive coding. The P picture is a picture that is coded from the preceding I picture or the preceding P picture by inter-frame prediction. The B picture is a picture that is coded by the inter-frame prediction using the preceding (forward directional) or subsequent (backward directional) picture, or both the preceding and the subsequent (bidirectional) pictures. The GOP includes at least one I picture, so that a still image of a predetermined number of frames can be restored by loading the frames in the unit of GOP to minimize the number of loaded frames.

Referring again to FIG. 7, at Step S203, the image processing apparatus 150 reads the additional information from the video file, and prepares the conversion table unique to the particular omnidirectional camera 110 that has photographed the video file. At Step S204, the image processing apparatus 150 applies the conversion to the respective pieces of image data of the predetermined number of frames restored from the respective video files, based on the acquired tilt angles and the read additional information.

Figure 9:
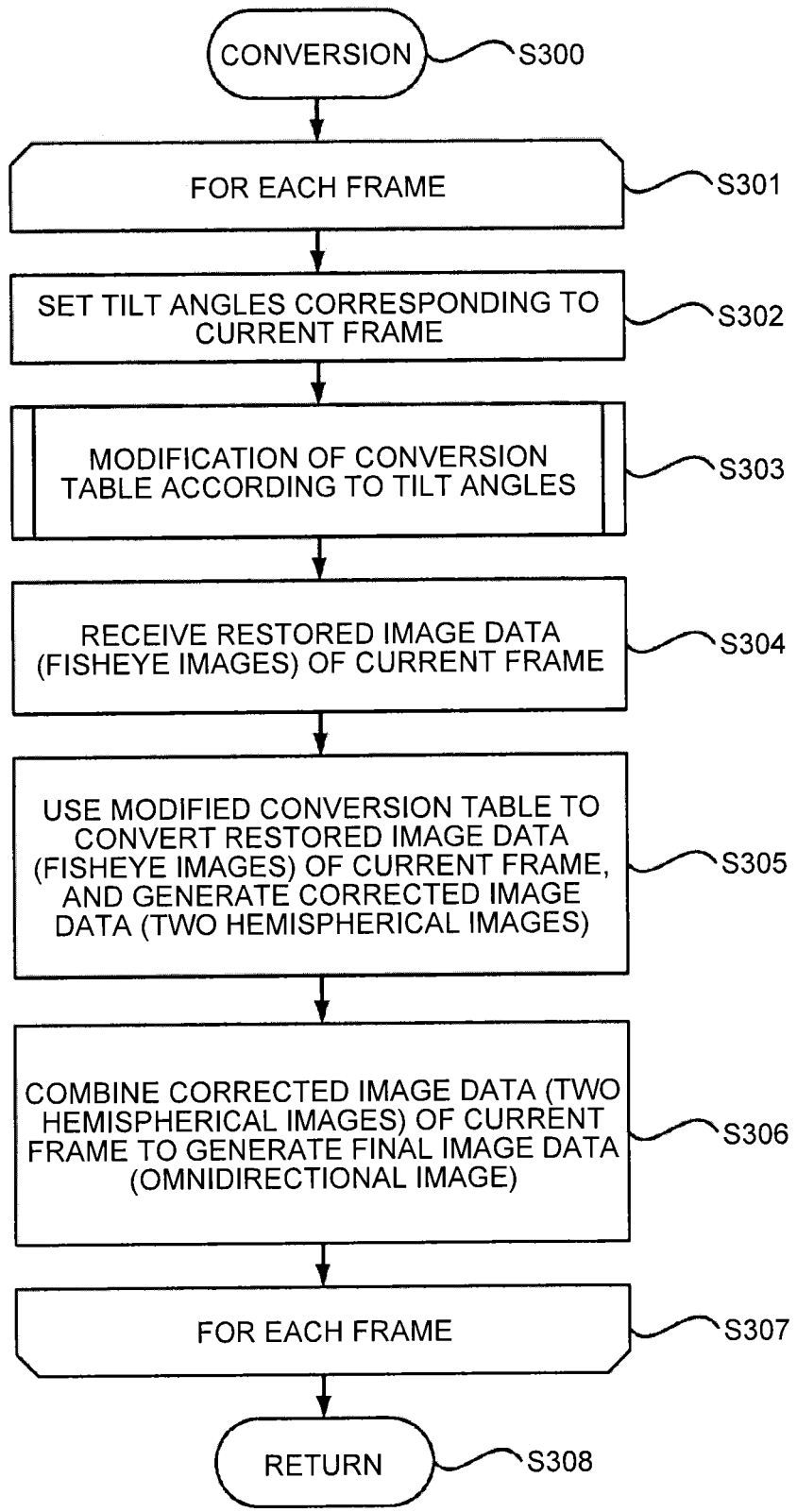
FIG. 9 is a flowchart illustrating conversion performed by the image processing apparatus constituting the omnidirectional video imaging system according to the embodiment.

FIG. 9 is a flowchart illustrating the conversion performed by the image processing apparatus 150 constituting the omnidirectional video imaging system 100 according to the present embodiment. The conversion illustrated in FIG. 9 is called at Step S204 illustrated in FIG. 7, and starts from Step S300. In the loop of Steps S301 to S307, processing at Steps S302 to S306 is performed on a frame-by-frame basis.

At Step S302, the image processing apparatus 150 sets the tilt angles α and β corresponding to the frame. At Step S303, the conversion table modifying unit 260 of the image processing apparatus 150 modifies the conversion table according to the acquired tilt angles α and β. The modification to the conversion table will be described later in detail.

At Step S304, the image processing apparatus 150 receives two pieces of the restored image data of the frame. At Step S305, the omnidirectional image generating unit 262 of the image processing apparatus 150 uses the modified conversion table to convert the two pieces of restored image data (each including the fisheye image) of the frame, and generates two pieces of corrected image data (two omnidirectional images each covering one of the hemispheres corresponding to the two respective fisheye images). At Step S306, the image processing apparatus 150 combines the two pieces of corrected image data (each covering the corresponding one of the hemispheres) of the frame to generate the final image data (omnidirectional image).

FIG. 10A is a diagram explaining a case in which the omnidirectional image format is represented by a flat surface, and FIG. 10B is a diagram explaining a case in which the omnidirectional image format is represented by a spherical surface. As illustrated in FIG. 10A, the format of the omnidirectional image represents an image that has, when developed in a flat plane, pixel values corresponding to angular coordinates in the horizontal angular range from 0 degrees to 360 degrees and in the vertical angular range from 0 degrees to 180 degrees. The angular coordinates correspond to the respective coordinate points on the spherical surface illustrated in FIG. 10B, and are similar to the latitude and longitude coordinates on a globe.

The relation between the planar coordinate values of the image photographed with the fisheye lenses and the spherical coordinate values of the omnidirectional image can be associated with one another by using a projection function $f(h=f(\theta))$ such as that described using FIGS. 5A and 5B. The omnidirectional image as illustrated in FIGS. 10A and 10B can thus be created by converting and joining (combining) the two partial images photographed with the fisheye lenses.

The following describes a process of generating the omnidirectional image using images actually photographed with the fisheye lens. FIG. 11 is a diagram explaining the images captured by the imaging elements 130A and 130B through the two fisheye lenses in the omnidirectional camera 110 according to the present embodiment, and explaining the image generated in the image processing apparatus 150 according to the present embodiment by converting the captured images with the conversion table and combining together the two converted images.

In FIG. 11, the partial images photographed by the imaging elements 130A and 130B through the two fisheye lenses are first converted into the two omnidirectional images by the processing at Step S305 described with reference to FIG. 9, that is, by the image conversion using the conversion table after being modified. At this time, the images are expressed in the expression format conforming to the omnidirectional image format, that is, in the expression format corresponding to FIGS. 10A and 10B.

The final omnidirectional image illustrated in FIG. 11 is generated by the processing at Step S306 illustrated in FIG. 9, that is, by the image combining processing after the conversion of the two images. Specifically, the two omnidirectional images each covering the corresponding one of the hemispheres are superposed and combined with each other using overlapping portions as clues to create the final omnidirectional image.

FIG. 11 also illustrates a correspondence relation between positions of pixels in the partial images and positions of pixels corresponding thereto in the omnidirectional image. When the omnidirectional camera 110 is correctly placed in the vertical direction and takes a photograph without tilting, and the direct upward direction of the omnidirectional camera 110 is along the vertical line, simply correcting distortion can obtain an image in which what a photographer recognizes as the zenith and the horizontal line coincide with the actual ones, as illustrated in FIG. 11. At this time, the horizontal line is positioned at the center in each of the partial images, and is also located in a position corresponding to the equator of a globe, in the omnidirectional image.

Referring again to FIG. 9, after the process comes out of the loop of Steps S301 to S307, the current process ends at Step S308, and the process returns to the calling process illustrated in FIG. 7.

Referring again to FIG. 7, at Step S205, the video generating unit 264 of the image processing apparatus 150 encodes the converted image data of the predetermined number of frames to generate video data corrected in tilt, and writes the video data into the video file 270 of the omnidirectional image. At Step S206, the image processing apparatus 150 determines whether the last frame of the read video file 230 is reached. If it is determined that the last frame has not been reached (No at Step S206), the process loops back to Step S201, and the next frame group is processed. If it is determined that the last frame is reached (Yes at Step S206), the process branches to Step S207, and the recording processing ends.

It is preferable to execute, between Step S204 and Step S205, processing, such as image processing to reduce temporal noise, image correction to reduce, for example, noise, including mosquito noise and block noise, resulting from a video compression codec and blurring of outlines, and processing to modify hues. Improvement in the image quality of the final image can be thus expected.

The following describes the processing to modify the conversion table for the omnidirectional image in the present embodiment according to the recorded tilt angles of the omnidirectional camera 110, with reference to FIGS. 12A to 14B.

Figures 12A, 12B:
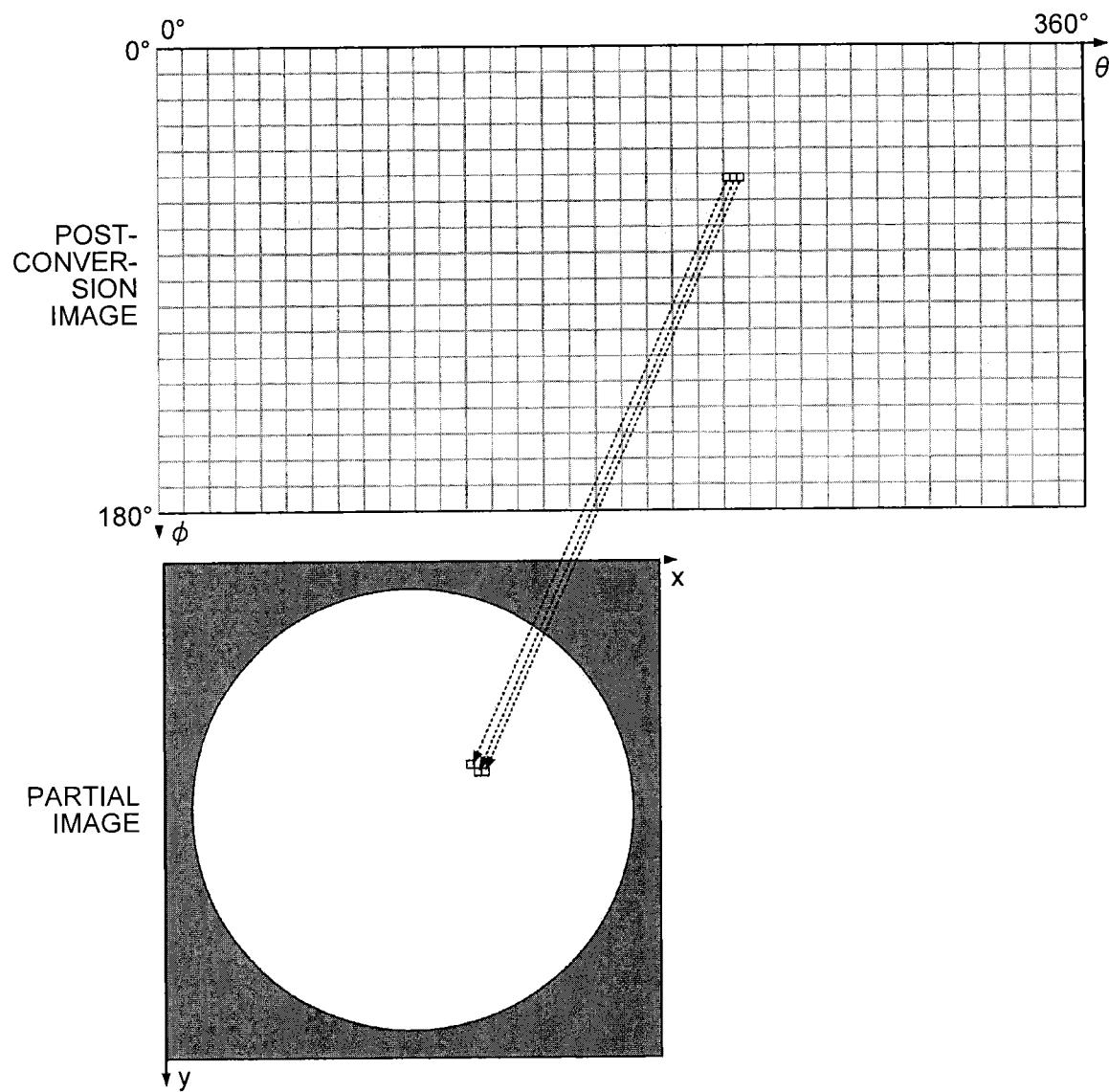
FIGS. 12A and 12B are diagrams explaining a conversion table for an omnidirectional image in the embodiment.

FIGS. 12A and 12B are diagrams explaining the conversion table for the omnidirectional image in the present embodiment. FIG. 12A is a diagram explaining the conversion table representing a matrix of image coordinate values before and after the conversion. FIG. 12B is a diagram explaining a relation between the coordinate values of the post-conversion image and the coordinate values of the pre-conversion image.

As illustrated in FIG. 12A, the conversion table used for the image conversion described at Step S303 illustrated in FIG. 9 includes a data set of the coordinate values (θ,φ) (pix (standing for "pixel")) of the post-conversion image and the coordinate values (x,y) (pix) of the pre-conversion image corresponding to those of the post-conversion image, for each of the coordinate values of the post-conversion image. In the embodiment described herein, the conversion table is illustrated as having a tabular data structure. However, the conversion table need not have a tabular data structure. That is, the conversion table only needs to be conversion data.

The post-conversion image can be generated from the captured partial image (pre-conversion image) according to the conversion table illustrated in FIG. 12A. Specifically, as illustrated in FIG. 12B, the correspondence relation between before and after the conversion given in the conversion table (FIG. 12A) allows each of the pixels of the post-conversion image to be generated by referring to a pixel value at the coordinate values (x,y) (pix) of the pre-conversion image corresponding to the coordinate values (θ,φ) (pix).

The distortion correction is reflected into the conversion table before the modification on the assumption that the direct upward direction of the omnidirectional camera 110 coincides with the vertical line. After the conversion table is modified according to the tilt angles, the zenith correction is reflected in the conversion table so as to make the direct upward direction of the omnidirectional camera 110 coincide with the vertical line.

Figure 13:
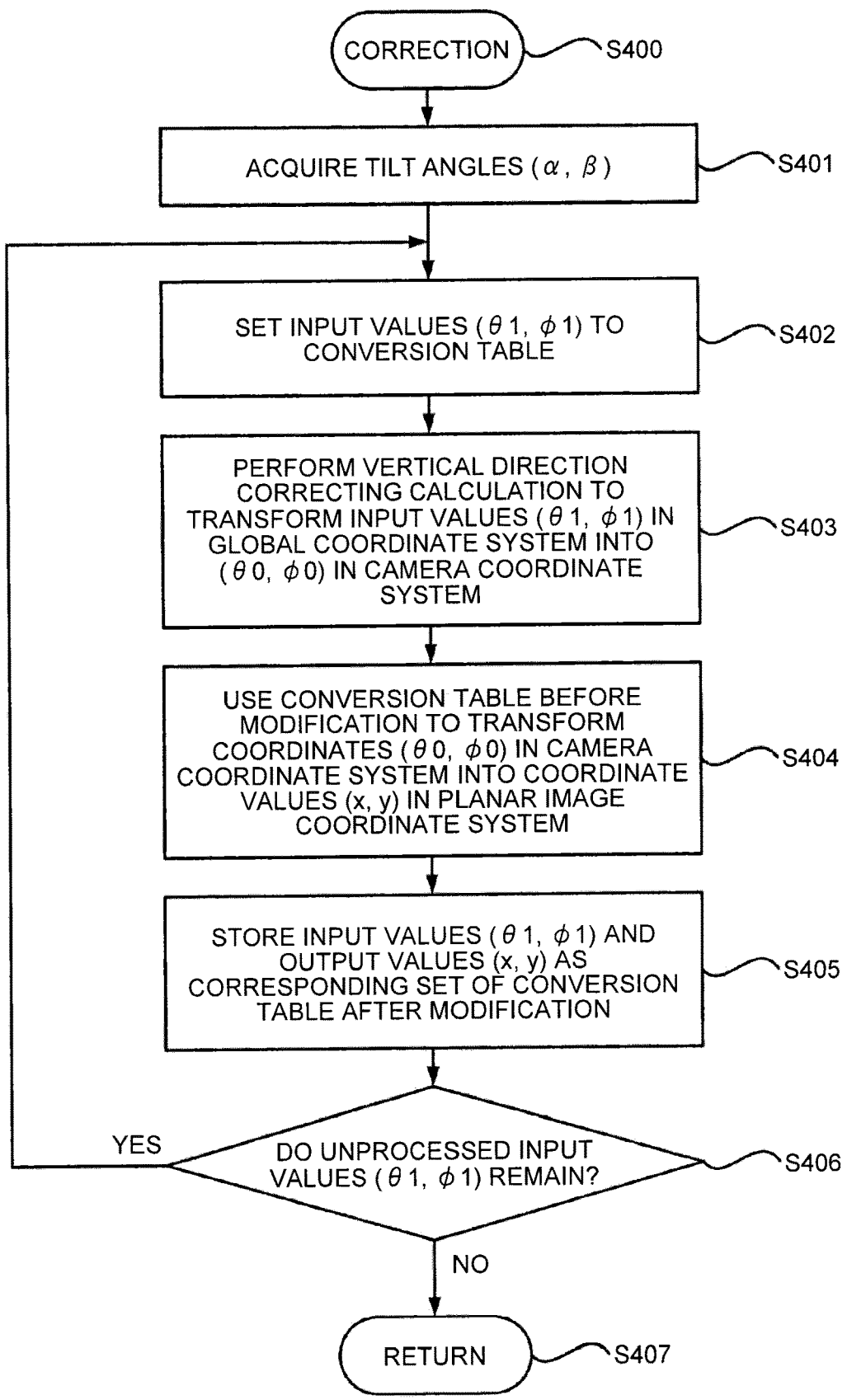
FIG. 13 is a flowchart explaining an operation flow of modification to the conversion table for the omnidirectional image in the embodiment.

FIG. 13 is a flowchart explaining an operation flow of the modification to the conversion table for the omnidirectional image in the present embodiment. The modification illustrated in FIG. 13 is called at Step S303 illustrated in FIG. 9, and starts from Step S400.

In FIG. 13, at Step S401, the conversion table modifying unit 260 of the image processing apparatus 150 acquires the tilt angles (α,β) corresponding to the frame to be processed. At Step S402, the conversion table modifying unit 260 of the image processing apparatus 150 sets input values (θ1, φ1) to the conversion table. In FIG. 13, parameter values (θ,φ) depending on the coordinate system are denoted as (θ0, φ0) for the camera coordinate system and as (θ1, φ1) for the global coordinate system so as to be distinguished from each other. That is, the parameters (θ1, φ1) in the global coordinate system are set at Step S402.

At Step S403, the conversion table modifying unit 260 of the image processing apparatus 150 performs vertical direction correcting calculation to transform the input values (θ1, φ1) in the global coordinate system into (θ0, φ0) in the camera coordinate system.

The vertical direction correcting calculation will be described. FIG. 14A is a diagram explaining vertical direction correcting calculation for the omnidirectional image using the camera coordinate system, and FIG. 14B is a diagram explaining vertical direction correcting calculation for the omnidirectional image using the global coordinate system.

Figure 14B:
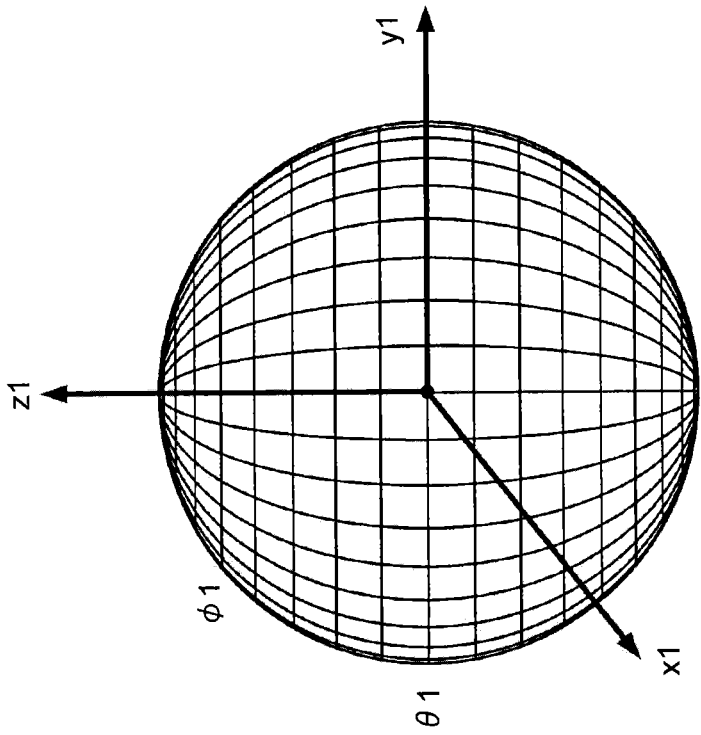
FIG. 14B is a diagram explaining vertical direction correcting calculation for the omnidirectional image using the global coordinate system.
Figure 14A:
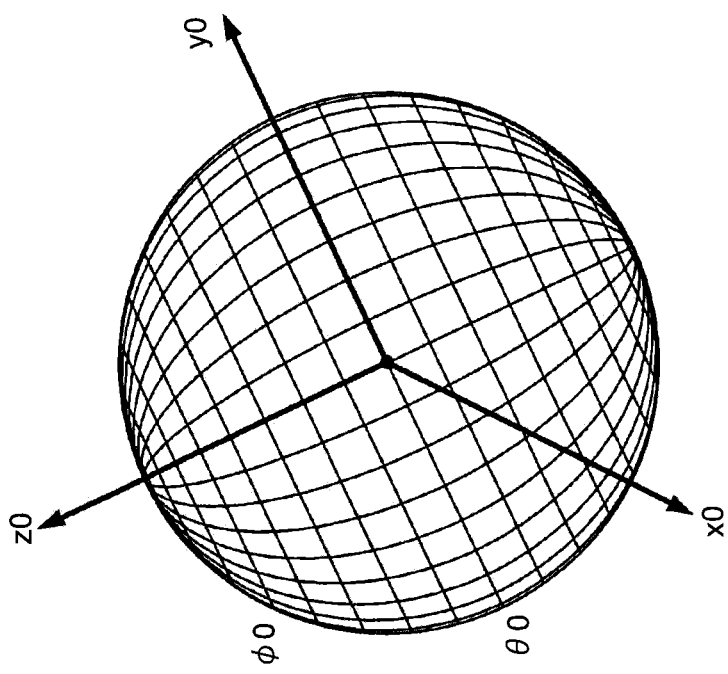
FIG. 14A is a diagram explaining vertical direction correcting calculation for the omnidirectional image using the camera coordinate system.

In FIGS. 14A and 14B, three-dimensional orthogonal coordinates and spherical coordinates are denoted as (x1, y1, z1) and (θ1, φ1), respectively, in the global coordinate system, and the three-dimensional orthogonal coordinates and the spherical coordinates are denoted as (x0, y0, z0) and (θ0, φ0), respectively, in the camera coordinate system.

The vertical direction correcting calculation uses the following expressions (3) to (8) to transform the spherical coordinates (θ1, φ1) into the spherical coordinates (θ0, φ0). First, to correct the tilt, rotational transformation needs to be applied using the three-dimensional orthogonal coordinates. The following expressions (3) to (5) are thus used to transform the spherical coordinates (θ1, φ1) into the three-dimensional orthogonal coordinates (x1, y1, z1).

$$x1 = \sin(\phi1)\cos(\theta1) \quad (3)$$

$$y1 = \sin(\phi1)\sin(\theta1) \quad (4)$$

$$z1 = \cos(\phi1) \quad (5)$$

$$\begin{pmatrix} x0 \\ y0 \\ z0 \end{pmatrix} = \begin{pmatrix} \cos\alpha & \sin\alpha & 0 \\ -\sin\alpha & \cos\alpha & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} x1 \\ y1 \\ z1 \end{pmatrix} \quad (6)$$

-continued $$\phi 0 = \text{Arccos}(z0) \qquad (7)$$

$$\theta 0 = \text{Arctan}\left(\frac{y0}{x0}\right) \qquad (8)$$

Then, using the tilt angles ($\alpha,\beta$), the rotational coordinate transformation (the above expression (6)) mentioned above is performed to transform the global coordinate system (x1, y1, z1) into the camera coordinate system (x0, y0, z0). In other words, the above expression (6) gives the definition of the tilt angles ($\alpha,\beta$).

The expression (6) means that the global coordinate system is first rotated by $\alpha$ about the z-axis, and is then rotated by $\beta$ about the x-axis to result in the camera coordinate system. Finally, expressions (7) and (8) given above are used to transform the three-dimensional orthogonal coordinates (x0, y0, z0) into the spherical coordinates ($\theta 0$, $\phi 0$), in the camera coordinate system.

The following describes another embodiment of the vertical direction correcting calculation. The vertical direction correcting calculation in the still other embodiment can use the following expressions (9) to (16) to transform the spherical coordinates ($\theta 1$, $\phi 1$) into the spherical coordinates ($\theta 0$, $\phi 0$). The still other embodiment can increase the speed of the vertical direction correcting calculation. The above transformation equations (3) to (8) are rewritten into the above expressions (9) to (16).

$$x1' = \sin(\phi 1)\cos(\theta 1) \qquad (9)$$

$$y1' = \sin(\phi 1)\sin(\theta 1) \qquad (10)$$

$$z1' = \cos(\phi 1) \qquad (11)$$

$$\begin{pmatrix} x0' \\ y0' \\ z0' \end{pmatrix} = \begin{pmatrix} 1 & 0 & 0 \\ 0 & \cos\beta & \sin\beta \\ 0 & -\sin\beta & \cos\beta \end{pmatrix} \begin{pmatrix} x1' \\ y1' \\ z1' \end{pmatrix} \qquad (12)$$

$$\phi 0' = \text{Arccos}(z0') \qquad (13)$$

$$\theta 0' = \text{Arctan}\left(\frac{y0'}{x0'}\right) \qquad (14)$$

$$\theta 0 = \theta 0' - \alpha \qquad (15)$$

$$\phi 0 = \phi 0' \qquad (16)$$

That is, rotations $\alpha$ and $\gamma$ about the z-axis are equivalent to a rotation of $\theta$ of the spherical coordinates ($\theta$, $\phi$). Hence, the rotational transformation can be achieved by simple addition and subtraction without the transformation into the orthogonal coordinate system. As a result, only the rotational transformation by the rotation of $\beta$ about the x-axis involves the transformation using the orthogonal coordinate system. This results in a higher calculation speed.

In the embodiment describe above, the vertical direction correcting calculation transforms the coordinates. However, in still another embodiment, the processing of the vertical direction correcting calculation is eliminated by storing a plurality of conversion tables so that each of the tables has values different from those in other tables according to the tilt angles ($\alpha,\beta$), whereby the speed can be further increased. That is, while the tilt angles ($\alpha,\beta$) are represented by a three-dimensional real number vector in principle, the conversion tables are prepared for only certain tilt angles ($\alpha,\beta$), and a table having values nearest to detected tilt angles ($\alpha,\beta$) is employed, so that the transformation can be performed in all cases. Alternatively, interpolation calculation can be effectively performed in which a plurality of tables having values near the detected tilt angles ($\alpha,\beta$) are extracted, and the values are weighted according to proximity or differences are taken. The conversion table can thus be corrected simply by the interpolation calculation, which is a relatively simple calculation, so that the amount of processing needed for the calculation can be reduced.

Referring again to FIG. 13, at Step S404, the conversion table modifying unit 260 of the image processing apparatus 150 subsequently uses the conversion table before the modification to transform the converted coordinates ($\theta 0$, $\phi 0$) in the camera coordinate system into the coordinate values (x,y) of the pre-conversion image. This operation is based on the assumption that the conversion table has been prepared in advance to generate a correct omnidirectional image created under the condition that the camera is not tilted.

At Step S405, the conversion table modifying unit 260 of the image processing apparatus 150 stores the input values ($\theta 1$, $\phi 1$) in the global coordinate system and the coordinate values (x,y) before the modification that have been finally calculated, as a set of corresponding coordinates of the conversion table after the modification.

At Step S406, the image processing apparatus 150 determines whether unprocessed input values ($\theta 1$, $\phi 1$) remain, that is, whether input values ($\theta 1$, $\phi 1$) in the global coordinate system remain for which the coordinate values (x, y) before the modification corresponding thereto have not been calculated. If it is determined that the values remain (Yes at Step S406), the process loops back to Step S402 so as to set the input values ($\theta 1$, $\phi 1$) in the global coordinate system, as next values.

If it is determined that the values do not remain (No at Step S406), the process branches to Step S407 to end the processing and return to the calling process illustrated in FIG. 9. In this case, the coordinate values (x, y) before being corrected have been calculated that correspond to the respective pixels in the omnidirectional image format, each of which has coordinate values of the input values ($\theta 1$, $\phi 1$) in the global coordinate system.

Figure 15:
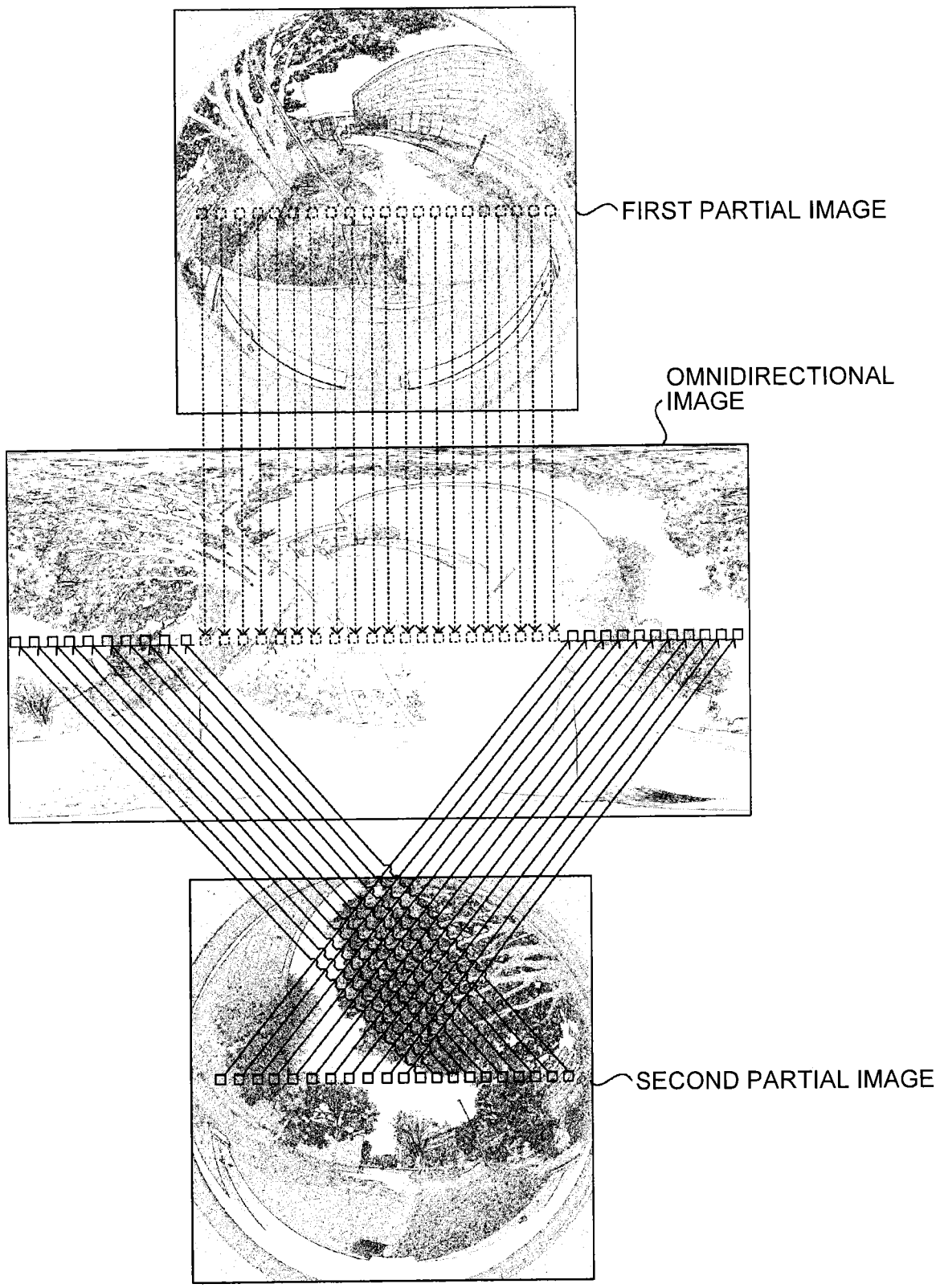
FIG. 15 is a diagram explaining frames of a video before tilt correction.
Figure 16:
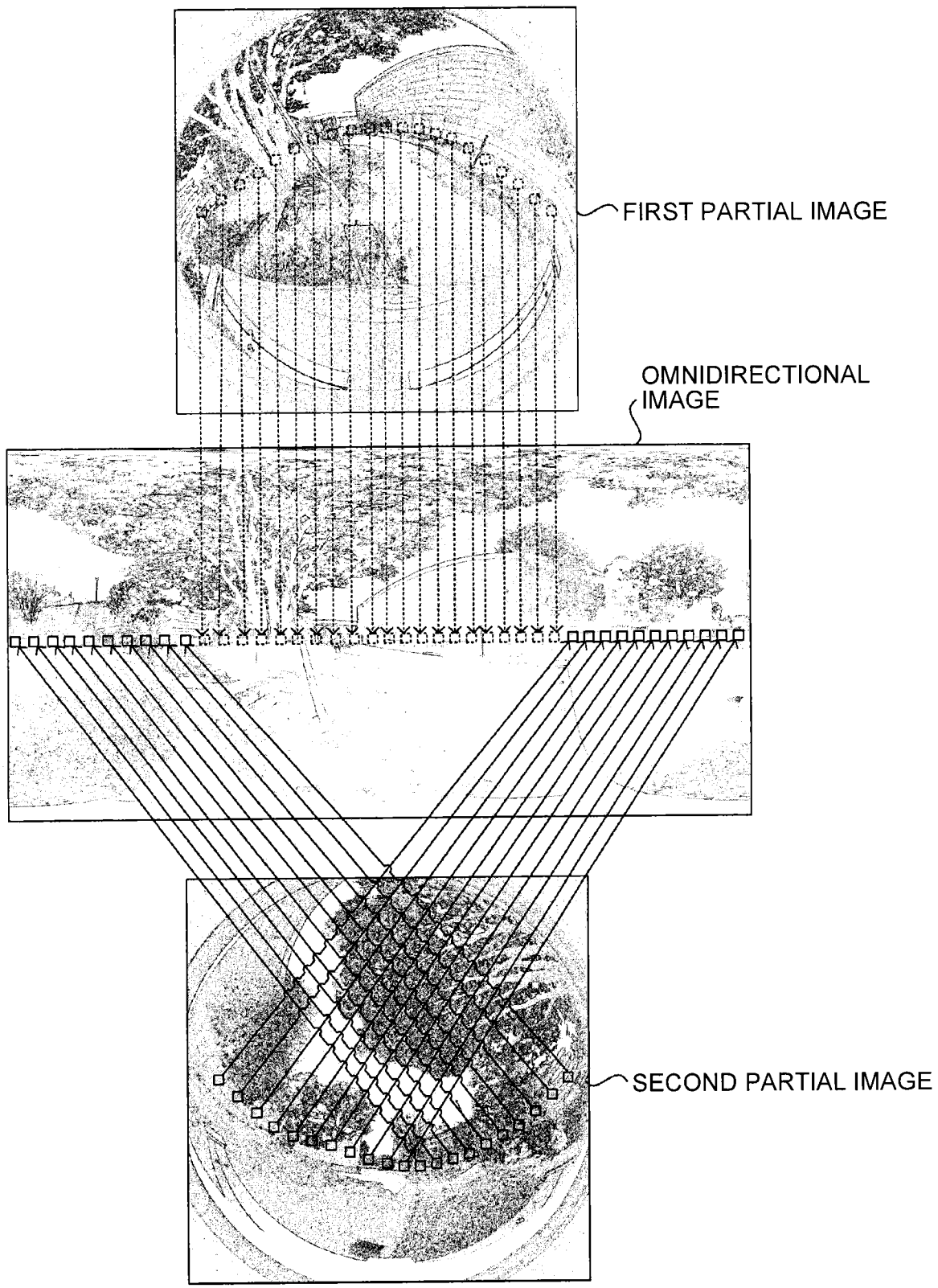
FIG. 16 is a diagram explaining the frames of the video after the tilt correction.

The following describes the frames of the video obtained by specific processing to correct the tilt, with reference to FIGS. 11, 15, and 16. FIG. 15 is a diagram illustrating the frames of the video before the tilt correction (the omnidirectional image being converted using the unmodified conversion table), and FIG. 16 is a diagram illustrating the frames of the video after the tilt correction (the omnidirectional image being converted using the modified conversion table). FIG. 11 illustrates the case in which the omnidirectional camera 110 is not tilted such that the direct upward direction coincides with the vertical line, and FIGS. 15 and 16 illustrate the case in which the omnidirectional camera 110 is tilted such that the direct upward direction does not coincide with the vertical line.

As described above, when the omnidirectional camera 110 is correctly placed in the vertical direction, the images can be captured so that what the photographer recognizes as the zenith and the horizontal line coincide with the actual ones, as illustrated in FIG. 11. The omnidirectional camera 110 can capture the images while being correctly oriented in the vertical direction if the camera can be mounted on a fixing device and be adjusted in attitude using a level or the like to capture the images.

In general, however, when images are captured by a camera held by a person, the images are difficult to be captured with the horizontal and vertical directions thereof correctly expressed. If the images are captured by a tilted camera body, without tilt correction, the zenith directions of the respective images differ from each other, and the horizontal line is distorted as illustrated in FIG. 15. At this time, the centerlines of the partial images coincide with the equator of the omnidirectional image, but what the photographer recognizes as the horizontal line is distorted as a curve in the omnidirectional image. If the video without being corrected is viewed as illustrated in FIG. 15, changing the field of view during the viewing causes uncomfortable feeling, such as the 3D sickness, due to the difference between the vertical direction and the central axis of the omnidirectional camera 110.

In contrast to this, the present embodiment obtains the frames as illustrated in FIG. 16 by encoding the image data after converting the images of all frames so that the upward vertical direction coincides with the upward zenith direction. In other words, what the photographer recognizes as the horizontal line is expressed as curves in the partial images, but coincides with the equator in the omnidirectional image. Converting the images in this way can create the omnidirectional video that does not give the user unnatural feeling, such as the 3D sickness, when the field of view is changed during the viewing.

According to the embodiment described above, an imaging system, an imaging apparatus, a computer program, and a system can be provided that enable detection of a tilt of an image capturing unit with respect to a reference direction, and generation of video data that is corrected in tilt according to the detected tilt.

The omnidirectional video imaging and recording function according to the present embodiment stores, as a separate file, the tilt angle data in which the tilt angles of the omnidirectional camera 110 are associated with the respective frames of the video image at the same frequency as that of recording the frames of the video image. While the data of the tilt angle file is synchronized with the frames, the tilt is corrected in each of the frames while referring to the data of the tilt angle file, and the video image is displayed and encoded again. As a result, the omnidirectional video data can be obtained in which the vertical direction is correct, and hence, the omnidirectional video data can be provided that does not cause uncomfortable feeling or unnatural feeling, such as the 3D sickness, when the user changes the field of view.

In the case of the still image, the display application can solve the problem by forming the field of vision taking into account the correction of the tilt angle when the image is displayed, so that the tilt correction is not necessary. In the case of the video data, however, the displayed picture is always changing typically at 15 to 30 frames per second, so that solving the problem during the viewing is difficult. As described above, the omnidirectional video in which the tilt angles are corrected in advance is encoded to generate the video file, so that the omnidirectional video can preferably be displayed without giving the viewer uncomfortable feeling, such as the 3D sickness.

The embodiment described above superposes and combines the two partial images that have been captured through the lens optical systems having an angle of view of larger than 180 degrees. However, another embodiment may be applied to superposition and combination of three or more partial images that have been captured through one or more lens optical systems. While the embodiment has been described above by way of the example of the imaging system using the fisheye lenses, the embodiment may be applied to an omnidirectional video imaging system that uses ultra-wide-angle lenses.

In the embodiment described above, the captured images of the frames are temporarily compressed into the image data in the video format, and the compressed image data in the video format and the time-series data of the tilt are output from the omnidirectional camera 110. The image processing apparatus 150 reads the image data in the video format and the time-series data of the tilt that have been output, restores the image of each of the frames from the read image data in the video format, and applies the tilt correction to the restored image of each of the frames.

However, another embodiment may directly output the successive frames of still images as a group, without compressing the frames into the image data in the video format. Specifically, in the other embodiment, the omnidirectional camera 110 outputs the images of the frames and the time-series data of the tilt. The image processing apparatus 150 can read the images of the frames and the time-series data of the tilt output from the omnidirectional camera 110, and apply the tilt correction to the image of each of the frames that have been read.

Moreover, in the embodiment described above, the omnidirectional camera 110 transfers the video file and the tilt angle file to the image processing apparatus 150 via the external storage. However, the method for transferring the video data and the tilt angle data is not limited. The omnidirectional camera 110 may transfer the video data and the tilt angle data to the image processing apparatus 150 through a communication tool, such as the above-mentioned USB connection or a wireless LAN connection.

Moreover, in the embodiment described above, the image data in the video format is created from the images captured by the respective imaging elements 130A and 130B of the omnidirectional camera 110, and the image processing apparatus 150 combines the images. The present invention is, however, not limited to this configuration.

Specifically, the omnidirectional camera 110 may combine in advance the images that have been captured by the imaging elements 130A and 130B as described above, and generate the image data in the video format from the combined image, and the image processing apparatus 150 may process the generated data. In this case, the image processing apparatus need not combine the images.

In addition, the above embodiment has been described that the omnidirectional video imaging system includes the omnidirectional camera 110 and the image processing apparatus 150 as separate bodies. The present invention is, however, not limited to this configuration. That is, the omnidirectional video imaging system may include the omnidirectional camera 110 and the image processing apparatus 150 as one body. In this case, a common CPU may be configured to serve as the CPU 112 and the CPU 152. Each of a bus 142 and a bus 168 for data transfer is constituted by one line, and the hardware members are connected through the common bus. This configuration eliminates the need for transferring data using an external storage, or a wired or wireless communication tool. Moreover, in this case, the video file and the tilt angle file need not be separately recorded. Instead, when the tilt angles and the images corresponding thereto have been obtained, image data may be generated in which the tilt is corrected (converted) according to the tilt angles, and video data may be generated from the image data, and may be recorded into the DRAM 132, the RAM 154, or the HDD 156, or displayed on the display 162.

Furthermore, in the embodiment described above, the image is determined to be not tilted when the vertical direction coincides with the direct upward direction of the omnidirectional camera 110. The present invention is, however, not limited to this criterion. Instead of the vertical direction, for example, the horizontal direction or another desired direction may be set as a reference direction, and the tilt of the image may be corrected based on the tilt of a specified body, such as the omnidirectional camera 110 or the imaging element 130A or 130B, with respect to the reference direction. While the embodiment described above uses the acceleration sensor to detect the tilt, another tilt sensor, such as a combination of an acceleration sensor and a geomagnetic sensor, may detect the tilt of, for example, the omnidirectional camera 110, the imaging element 130A or 130B fixed to the omnidirectional camera 110, or the sensor itself.

The functional units described above can be implemented by a computer-executable program written in a legacy programming language, such as an assembly language, C, C++, C#, or Java (registered trademark), or an object-oriented programming language. The program can be distributed by being stored in a computer-readable recording medium, such as a ROM, an EEPROM, an EPROM, a flash memory, a flexible disk, a CD-ROM, a CD-RW, a DVD-ROM, a DVD-RAM, a DVD-RW, a Blu-ray Disc, an SD card, and an MO disk, or through an electric communication line. All or some of the functional units described above can be implemented, for example, on a programmable device (PD) such as a field-programmable gate array (FPGA), or as an application-specific integrated circuit (ASIC). To implement such functional units on the PD, circuit configuration data (bit-stream data) to be downloaded to the PD can be distributed using a recording medium that stores data written in, for example, a hardware description language (HDL), Very High Speed Integrated Circuit Hardware Description Language (VHDL), or Verilog HDL.

The configuration described above enables detection of a tilt of an image capturing unit with respect to a reference direction, and generation of video data that is corrected in tilt according to the detected tilt.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging system, comprising:
   an omnidirectional camera including a plurality of lenses, each with a different image capturing direction, and first processing circuitry configured to
      capture a plurality of associated images through the plurality of lenses over a period of time to capture a sequence of the plurality of associated images;
      detect, while capturing the sequence of the plurality of associated images, a tilt angle of the omnidirectional camera with respect to a direction of gravity and generate tilt angle data; and
      record a time series of the tilt angle data corresponding to the sequence of the plurality of associated images into a memory; and
   an image processing apparatus including second processing circuitry configured to
      access the sequence of the plurality of associated images and the time series of the tilt angle data corresponding to the plurality of associated images; and
      apply, based on the time series of the tilt angle data, a tilt correction with respect to the direction of gravity to each of the images of the sequence of the plurality of associated images to generate omnidirectional video data including a plurality of frames of omnidirectional images with corrected tilt angles, so that a zenith direction of the omnidirectional images of the plurality of frames that are corrected coincide with the direction of gravity,
   wherein:
   the first processing circuitry is further configured to generate fisheye images, and the second processing circuitry is further configured to convert the fisheye images into the omnidirectional images by using a conversion table, the conversion table including design data of lens optical systems of the omnidirectional camera, and
   the conversion table is modified to reflect the zenith direction when a direct upward direction of the omnidirectional camera does not coincide with a vertical line.

2. The imaging system according to claim 1, wherein the first processing circuitry is further configured to
   compress the sequence of the plurality of associated images, and
   output the sequence of the plurality of associated images which has been compressed to the image processing apparatus,
the second processing circuitry is further configured to
   receive the sequence of the plurality of associated images which has been compressed and output by the first processing circuitry, and
in applying the tilt correction, the second processing circuitry is configured to
   decompress the sequence of the plurality of associated images which has been compressed,
   apply the tilt correction to the sequence of the plurality of associated images which has been decompressed, and
   generate the omnidirectional images with corrected tilt angles from the sequence of the plurality of associated images which has been decompressed.

3. The imaging system according to claim 1, wherein the first processing circuitry is configured to output the sequence of the plurality of associated images to the image processing apparatus, and
the second processing circuitry is configured to receive the sequence of the plurality of associated images output by the first processing circuitry.

4. The imaging system according to claim 1, wherein the omnidirectional camera includes a first wide-angle imaging optical system including one of the plurality of lenses and a second wide-angle imaging optical system including another of the plurality of lenses,
the first processing circuitry captures the sequence of the plurality of associated images of the plurality of frames by controlling the first wide-angle imaging optical system to capture first partial omnidirectional images and by controlling the second wide-angle imaging optical system to capture second partial omnidirectional images,
the second processing circuitry is configured to decompress the sequence of the plurality of associated images into the first and second partial omnidirectional images, modify, according to the time series of the tilt angle data, conversion data for converting the first partial omnidirectional images and the second partial omnidirectional images into data in a spherical coordinate system, convert, using the modified conversion data, the first partial omnidirectional images and the second partial omnidirectional images into data in the spherical coordinate system, generate adjusted omnidirectional images from the first partial omnidirectional images and the second partial omnidirectional images, and generate adjusted video data based on the adjusted omnidirectional images.

5. The imaging system according to claim 1, wherein the second processing circuitry is configured to load into a second memory, to apply the tilt correction, some of the images of the sequence of the plurality of associated images that are based on a starting frame.

6. The imaging system according to claim 1, wherein the omnidirectional camera includes an acceleration sensor, and
the first processing circuitry detects the tilt angle of the omnidirectional camera according to an output of the acceleration sensor.

7. An imaging apparatus, comprising:
processing circuitry configured to
capture a plurality of associated images through a plurality of lenses over a period of time to capture a sequence of the plurality of associated images of a subject;
detect a tilt of the imaging apparatus during capture of the sequence of the plurality of associated images with respect to a direction of gravity;
generate a time series of tilt angle data of the imaging apparatus according to the detected tilt;
record the sequence of the plurality of associated images; and
record, into a memory, the time series of the tilt angle data corresponding to the sequence of the plurality of associated images, wherein
an image processing apparatus accesses the sequence of the plurality of associated images and the time series of the tilt angle data corresponding to the sequence of the plurality of associated images and applies, based on corresponding tilt angle data, a tilt correction with respect to the direction of gravity to the sequence of the plurality of associated images to generate omnidirectional video data including adjusted omnidirectional images in a spherical coordinate system and having corrected tilt so that a zenith direction of the adjusted omnidirectional images coincide with the direction of gravity,
wherein:
the capture of the plurality of associated images captures fisheye images,
the processing circuitry further configured to convert the fisheye images into the omnidirectional images by using a conversion table, the conversion table including design data of lens optical systems of an omnidirectional camera that captures the fisheye images, and the processing circuitry to modify the conversion table to reflect the zenith direction when a direct upward direction of the omnidirectional camera does not coincide with a vertical line.

8. The imaging apparatus according to claim 7, wherein the processing circuitry is configured to associate each of the sequence of the plurality of associated images with corresponding tilt angle data based on the tilt of the imaging apparatus during capture of the sequence of the plurality of associated images.

9. The imaging apparatus according to claim 7, further comprising:
a plurality of cameras, wherein
the processing circuitry is configured to generate the omnidirectional video data based on the sequence of the plurality of associated images output from the plurality of cameras, and
the processing circuitry is configured to output the omnidirectional video data.

10. The imaging apparatus according to claim 7, further comprising:
a first wide-angle imaging optical system; and
a second wide-angle imaging optical system, wherein
the processing circuitry is configured to capture the sequence of the plurality of associated images by controlling the first wide-angle imaging optical system to capture first partial omnidirectional images and by controlling the second wide-angle imaging optical system to capture second partial omnidirectional images.

11. The imaging apparatus according to claim 7, further comprising:
an acceleration sensor, wherein
the processing circuitry is configured to detect the tilt of the imaging apparatus according to an output of the acceleration sensor.

12. A non-transitory computer-readable medium storing computer-executable instructions that, when executed by processing circuitry, cause an image processing apparatus to:
receive a sequence of a plurality of associated images which are fisheye images and which has been captured through a plurality of lenses over a period of time, and a time series of tilt angle data corresponding to the sequence of the plurality of associated images, the time series of tilt angle data representing a tilt angle of the imaging apparatus with respect to a direction of gravity during capture of the sequence of a plurality of associated images; and
apply, based on corresponding tilt angle data of the time series of tilt angle data, a tilt correction with respect to the direction of gravity to the sequence of the plurality of associated images to generate omnidirectional video data including omnidirectional images with corrected tilt angles using a conversion table, so that a zenith direction of the omnidirectional images that are corrected coincide with the direction of gravity, the conversion table including design data of lens optical systems of an omnidirectional camera
wherein the conversion table is modified to reflect the zenith direction when a direct upward direction of the omnidirectional camera does not coincide with a vertical line.

13. The non-transitory computer-readable medium according to claim 12, wherein
the sequence of the plurality of associated images are captured by an omnidirectional camera that comprises a first wide-angle imaging optical system and a second wide-angle imaging optical system, the omnidirectional camera captures the omnidirectional images by controlling the first wide-angle imaging optical system which includes a lens of the plurality of lenses to capture first partial omnidirectional images and by controlling the second wide-angle imaging optical system which includes another lens of the plurality of lenses to capture second partial omnidirectional images, the image processing apparatus is further caused to:
decompress the sequence of the plurality of associated images into the first and second partial omnidirectional images,
modify, according to the tilt angle of the imaging apparatus, conversion data for converting the first partial omnidirectional images and the second partial omnidirectional images into data in a spherical coordinate system;
convert, using the modified conversion data, the first partial omnidirectional images and the second partial omnidirectional images into data in the spherical coordinate system;
generate adjusted omnidirectional images from the first partial omnidirectional images and the second partial omnidirectional images; and
generate adjusted video data based on the adjusted omnidirectional images.

14. The non-transitory computer-readable medium according to claim 12, wherein the image processing apparatus is further caused to load, to apply the tilt correction, some of the omnidirectional images based on a starting image.

15. The non-transitory computer-readable medium according to claim 12, wherein
a device which captures the sequence of the plurality of associated images includes an acceleration sensor, and
the device which captures the sequence of the plurality of associated images detects the tilt of the imaging apparatus according to an output of the acceleration sensor.

16. The imaging system according to claim 1, wherein the second processing circuitry is configured to, in applying the tilt correction,
apply the tilt correction to an image conversion table unique to the omnidirectional camera based on the time series of the tilt angle data, the image conversion table for adjusting the omnidirectional images, and
generate the omnidirectional video data based on the images of the sequence of the plurality of associated images and the image conversion table corrected by the applied tilt correction.

17. The imaging system according to claim 1, wherein the first processing circuitry is configured to wirelessly transmit the images of the sequence of the plurality of associated images and the time series of the tilt angle data to the image processing apparatus, and the second processing circuitry is configured to receive the images of the sequence of the plurality of associated images and the time series of the tilt angle data from the omnidirectional camera.

18. The imaging apparatus according to claim 7, wherein the processing circuitry is configured to wirelessly transmit the images of the sequence of the plurality of associated images and the time series of the tilt angle data to the image processing apparatus.

19. The imaging system according to claim 1, wherein the first processing circuitry is further configured to
generate signals of acceleration components of a sensor based on the detected tilt angle, and
record the plurality of pieces of tilt angle data corresponding to the sequence of the plurality of associated images into the memory by sampling the signals of the acceleration components in synchronization with the plurality of frames.

20. An imaging system, comprising:
an omnidirectional camera including first processing circuitry configured to
capture omnidirectional images of a plurality of frames;
detect a tilt angle of the omnidirectional camera with respect to a direction of gravity;
record the omnidirectional images of the plurality of frames; and
record a plurality of pieces of tilt angle data corresponding to the plurality of frames into a memory, each piece of tilt angle data corresponding to a respective frame of the plurality of frames and including the detected tilt angle of the omnidirectional camera with respect to the direction of gravity; and
an image processing apparatus including second processing circuitry configured to
access the omnidirectional images of the plurality of frames and the plurality of pieces of tilt angle data corresponding to the plurality of frames; and
apply, based on a corresponding piece of tilt angle data of the plurality of pieces of tilt angle data, a tilt correction with respect to the direction of gravity to each of the omnidirectional images of the plurality of frames to generate omnidirectional video data including omnidirectional images with corrected tilt angles, so that a zenith direction of the omnidirectional images of the plurality of frames that are corrected coincide with the direction of gravity,
wherein the first processing circuitry is further configured to generate fisheye images, and the second processing circuitry is further configured to convert the fisheye images into the omnidirectional images by using a conversion table, the conversion table including design data of lens optical systems of the omnidirectional camera, and
wherein the conversion table is modified to reflect the zenith direction when a direct upward direction of the omnidirectional camera does not coincide with a vertical line.

* * * * *